United States Patent [19]

Quan

[11] Patent Number: 6,058,191

[45] Date of Patent: May 2, 2000

[54] METHOD AND APPARATUS FOR MODIFYING THE ENVELOPE OF A RF CARRIER SIGNAL TO REMOVE COPY PROTECTION SIGNALS THEREFROM

[75] Inventor: Ronald Quan, Cupertino, Calif.

[73] Assignee: Macrovision Corp, Sunnyvale, Calif.

[21] Appl. No.: 08/794,797

[22] Filed: Feb. 4, 1997

[51] Int. Cl.[7] .................................................. H04N 7/167
[52] U.S. Cl. ........................................ 380/203; 380/221
[58] Field of Search .................................. 380/10, 5, 15, 380/9, 48, 200, 201, 203, 210, 204, 221

[56] References Cited

U.S. PATENT DOCUMENTS

| | | |
|---|---|---|
| 4,163,252 | 7/1979 | Mistry et al. ............................ 358/118 |
| 4,253,114 | 2/1981 | Tang et al. ............................... 358/114 |
| 4,467,358 | 8/1984 | Switsen . |
| 4,521,809 | 6/1985 | Bingham et al. ........................ 358/120 |
| 4,577,216 | 3/1986 | Ryan . |
| 4,631,606 | 12/1986 | Ryan . |
| 4,695,901 | 9/1987 | Ryan . |
| 5,157,510 | 10/1992 | Quan . |
| 5,161,188 | 11/1992 | Pires .......................................... 380/15 |
| 5,212,723 | 5/1993 | Griesshaber .............................. 380/11 |
| 5,528,379 | 6/1996 | Bhang ...................................... 358/335 |
| 5,812,665 | 9/1998 | Hoarty et al. ............................. 380/10 |

FOREIGN PATENT DOCUMENTS

| | | |
|---|---|---|
| 0831648 | 3/1998 | European Pat. Off. . |
| WO 96/36174 | 11/1961 | WIPO . |
| WO 9834401 | 8/1998 | WIPO . |

*Primary Examiner*—Tod R. Swann
*Assistant Examiner*—Trevor Quick
*Attorney, Agent, or Firm*—Gerow Brill; George Almeida

[57] ABSTRACT

A method and apparatus is disclosed for disabling the effect of copy protection signals embedded in video signals, wherein the detection and modification of the copy protection signals is accomplished in the RF domain rather than in the baseband video domain as typically accomplished at the present time. To this end, various embodiments are disclosed for deriving a timing control signal from the modulated RF carrier signal, which timing control signal is indicative of the television lines which contain the copy protection signals. Several techniques in the RF domain responsive to the timing control signal are disclosed for replacing, attenuating, suppressing, pulse narrowing or otherwise modifying the modulated RF carrier signal during the interval of the copy protection signals to disable the affects thereof, to allow the making of acceptable recordings during demodulation subsequently by, for example, a record VCR. Also disclosed are means for adding copy protection signals to an RF carrier signal modulated with a video signal by modulating, for example, the protection signals onto the RF carrier signal in the RF domain.

56 Claims, 10 Drawing Sheets

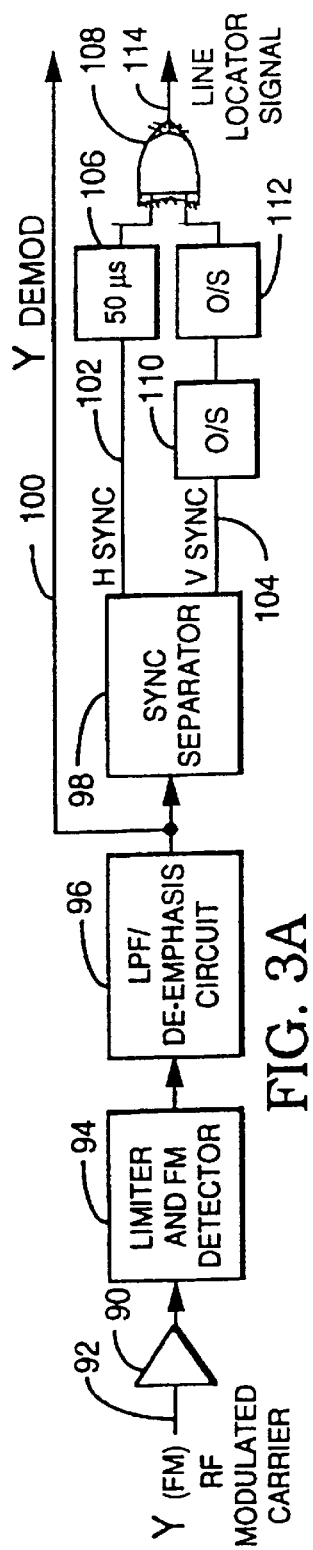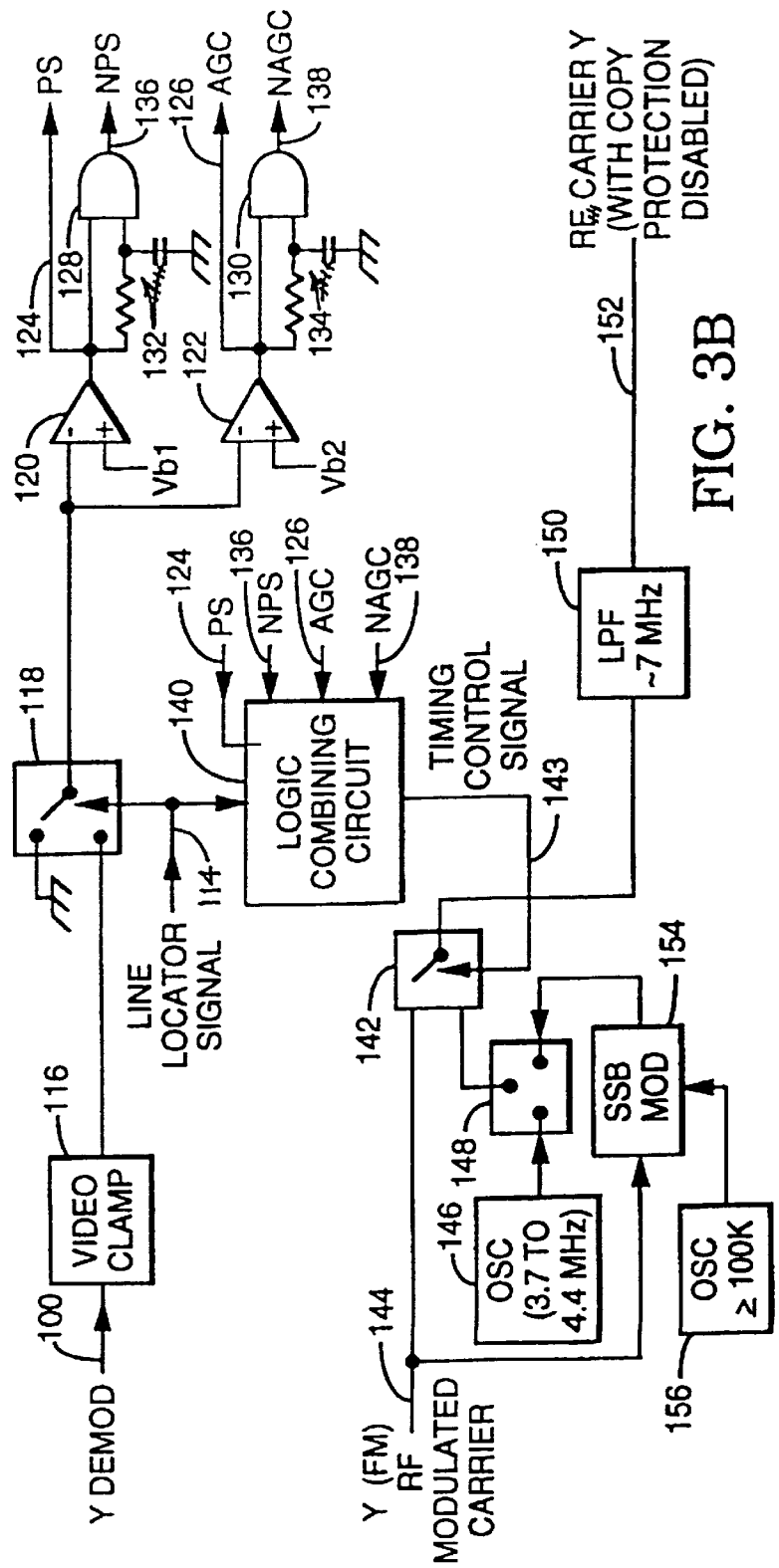
FIG. 3A
FIG. 3B

METHOD AND APPARATUS FOR MODIFYING THE ENVELOPE OF A RF CARRIER SIGNAL TO REMOVE COPY PROTECTION SIGNALS THEREFROM

CROSS REFERENCE TO RELATED APPLICATIONS AND PATENTS

This invention is related to commonly owned U.S. Pat. No. 4,631,603 entitled "METHOD AND APPARATUS FOR PROCESSING A VIDEO SIGNAL SO AS TO PROHIBIT THE MAKING OF ACCEPTABLE VIDEO TAPE RECORDINGS THEREOF" which issued on Dec. 23, 1986; to U.S. Pat. No. 4,577,216 entitled "METHOD AND APPARATUS FOR MODIFYING THE COLOR BURST TO PROHIBIT VIDEOTAPE RECORDING" issued on Mar. 18, 1986; to U.S. Pat. No. 4,626,890 entitled "METHOD AND APPARATUS FOR REMOVING PHASE MODULATION FROM THE COLOR BURST" issued on Dec. 2, 1986; to U.S. Pat. No. 4,695,901 entitled "METHOD AND APPARATUS FOR REMOVING PSEUDO-SYNC AND/OR AGC PULSES FROM A VIDEO SIGNAL" which issued on Sep. 22, 1987; to U.S. Pat. No. 4,907,093 for "METHOD AND APPARATUS FOR PREVENTING THE COPYING OF A VIDEO PROGRAM" issued on Jun. 26, 1990; to U.S. Pat. No. 4,819,098 for "METHOD AND APPARATUS FOR CLUSTERING MODIFICATIONS MADE TO A VIDEO SIGNAL TO INHIBIT THE MAKING OF ACCEPTABLE VIDEOTAPE RECORDINGS" issued on Apr. 4, 1989; to U.S. Pat. No. 5,157,510 for "METHOD AND APPARATUS FOR DISABLING ANTI-COPY PROTECTION SYSTEM IN VIDEO SIGNALS USING PULSE NARROWING" issued on Oct. 20, 1992; to U.S. Pat. No. 5,194,965 entitled "METHOD AND APPARATUS FOR DISABLING ANTI-COPY PROTECTION SYSTEM IN VIDEO SIGNALS" issued on Mar. 16, 1993; and to copending U.S. application Ser. No. 08/438,155, filed May 9, 1995 for "METHOD AND APPARATUS FOR DEFEATING EFFECTS OF COLOR BURST MODIFICATIONS TO A VIDEO SIGNAL".

BACKGROUND OF THE INVENTION

The invention relates to the removal of copy protection signals from a video signal and, in particular, to a method and apparatus for disabling such copy protection signals by selectively modifying the envelope of an RF carrier signal which has been modulated by the copy protection signals. The invention is applicable in various embodiments for restoring the copiability of video signals which have been prerecorded in a recording medium, have been transmitted via satellite, are generated by a television camera, and/or are recovered via transmission over a television channel or cable system. The invention further relates to the modification of a RF carrier signal, which is modulated by a standard video signal which does not contain copy protection signals, to add copy protection signals to the RF carrier signal in the RF domain.

As evidenced by the above cross reference to related applications and patents, there are various techniques known in the art for not only inhibiting the making of acceptable video recordings, but also for defeating such copy protection techniques to allow the video signal to be recorded, that is, copied in some manner. That is, under certain circumstances, there is a need to disable the copy protection system to permit recording of copy-protected recordings, such as, for example, during authorized and permitted copying or for studio editing purposes. As may be derived from the above-mentioned references, there are several basic techniques typically applied to provide copy protection of recorded video signals as well as off-air or transmitted video signals. Likewise, there are several basic techniques typically applied to defeat or otherwise remove the various copy protection techniques used with any of the various sources of video signals.

Exemplary of a copy protection technique is the subject matter of the U.S. Pat. Nos. 4,631,603, 4,819,098 and 4,907,093 of previous mention in the Cross Reference, the disclosures thereof being incorporated herein by reference, which concern modifying a video signal such that a television set produces normal video pictures from the modified signal, but a videotape recording made from the modified signal produces unacceptable pictures. These copy protection techniques rely on the addition of pseudo-sync signals, similar to the normal sync pulses, and/or the addition of high level positive pulses (hereinafter referred to as automatic gain control or AGC pulses) following the trailing edges of a percentage of the normal and pseudo-sync pulses. Such copy protection signals are hereinafter also referred to as "anti-copy pulses and/or signals." The pseudo-sync pulses, which extend from the blanking signal level to the normal sync tip level of the video signal, generally are added to the video signal during selected lines of the vertical blanking interval. Each of the pseudo-sync pulses may be followed by a respective high level AGC pulse of previous mention to provide pairs of pseudo-sync and AGC pulses which then are inserted at certain locations in the video signal, for example, in the vertical blanking interval or in the video lines immediately adjacent the vertical blanking interval. Copy protection is provided by the exaggerated voltage difference between the sync and/or pseudo-sync tip and the respective high AGC pulse level which, in turn, causes the automatic gain control (AGC) system in, for example, a videotape recorder or record VCR, to make an erroneous assessment of the video signal level. It follows that the AGC system produces a gain correction which results in reducing the signal recorded on videotape to a prohibitively low level. Thus, during playback of such a recording, the resulting recovered video signal will generate unstable pictures of unacceptably poor quality on a normal television set.

A further example of a copy protection technique is disclosed in the U.S. Pat. No. 4,577,216 of previous mention in the Cross Reference, which disclosure is incorporated herein by reference, and which concerns modifying a color video signal such that a television set produces a normal color picture while a videotape recording of the modified color video signal exhibits annoying color interference in the form of horizontally arranged color bands, hereinafter referred to as a "color stripe" effect. Such a color stripe effect also is considered to be, and is referred to herein as "anti-copy pulses or signals" or copy protection signals. To this end, the color burst signal integral with the video signal is phase modulated in any of various manners such as, for example, by a random, or pseudorandom noise signal, to produce a modified color burst signal having deliberate phase errors. It follows that the circuitry of a television set inherently ignores such phase modulation to produce an acceptable color picture, but the velocity error, or color stabilizer, correction circuit in a VCR will attempt to correct the introduced phase errors, as is disclosed in the above patent U.S. Pat. No. 4,577,216. As discussed therein, the velocity error correction circuit will cause the error to be transferred from the color burst signal to the chrominance signal of the video signal, thereby causing severe and objectionable color noise, that is, the color stripe effect, in the video color picture.

Exemplary of techniques for defeating or removing the effects of the copy protection systems of previous discussion above, are those disclosed in the U.S. Pat. Nos. 4,695,901, 5,157,510 and 5,194,965 of previous mention in the Cross Reference, and whose disclosures are incorporated herein by reference. The subject matters of these references are concerned with defeating or disabling the copy protection techniques of previous discussion which employ pseudo-sync and/or AGC pulses as anti-copy signals to inhibit copying of the video signal. To this end, the pseudo-sync and/or AGC pulses effectively may be removed or disabled by first determining the timing locations of the anti-copy pulses and then by level shifting, narrowing the width or otherwise increasing the frequency content, and/or by attenuating, replacing or otherwise modifying, at least some of the pulses by an amount that causes the VCR circuit to fail to respond to the anti-copy pulses which provide the copy protection. The AGC pulses may be removed by replacing them with another selected signal or by selectively blanking the video signal during predetermined time periods following the occurrence of sync pulses. Further, removal of pseudo-sync pulses may be accomplished by selectively clipping the negative-going pseudo-sync pulses in response to the detection of the pulses. Accordingly, such copy protection removal techniques contemplate various means which replace, suppress or otherwise modify the video signal such that, because of characteristics of a VCR, the anti-copy signals become less effective or are nullified to no longer prevent unauthorized copying.

Typical of techniques for defeating or removing the copy protection systems which generate the color stripe effect, are those disclosed in the U.S. Pat. No. 4,626,890 and copending U.S. application Ser. No. 08/438,155, filed May 9, 1995 of previous mention in the Cross Reference, and whose disclosures are incorporated herein by reference. The techniques disclosed in the latter patent and application rely on first determining the video line locations containing the color stripe bursts, either from prior analysis and programming in location to, for example, a programmable memory, or by sensing each color burst which contains a color stripe on a line-by-line basis using, for example, a phase detector circuit. Secondly, the references are concerned with defeating the color stripe effect by replacing the modulated color burst signal with a regenerated color burst subcarrier component, modifying the color stripe burst or otherwise modifying the video signal (for example, modifying the horizontal sync pulse preceding the color stripe burst), eliminating some of the color stripe bursts, attenuating the color stripe bursts in amplitude or duration, and/or removing, phase shifting or attenuating a portion of each color stripe burst or most of the color stripe bursts. Alternatively, the color burst signal, and thus any color stripe burst, can be replaced throughout the active television field with respective correct color burst signals, which thus permits subsequently recording an acceptable copy.

As may be seen by review of the above related references, the techniques and apparatus for providing copy protection as well as the techniques and apparatus for defeating the anti-copy signals of the copy protection systems, all operate in the baseband video domain using baseband video signals to derive the anti-copy pulses. Furthermore, the selected modifications of the anti-copy pulses, including the color stripe effect, to disable the copy protection systems to thereby allow the making of acceptable video signal recordings, also are performed in the baseband video domain.

The techniques for defeating copy protection in the baseband domain have the disadvantage of requiring the use of two separate leads containing an audio and a video signal, respectively, whereas the RF carrier based system of the present invention for defeating copy protection techniques requires a single lead carrying the RF carrier signal corresponding, for example, to a luminance signal. Further, when defeating copy protection signals in an off-air, cable, etc., environment, a copy protection defeating system in the baseband domain requires the added complexity of a tuner demodulator circuit to permit a recordable copy, whereas the RF carrier domain system does not.

SUMMARY OF THE INVENTION

The present invention provides an alternative method and apparatus for disabling the anti-copy pulses and/or the color stripe effect copy protection signals of previous discussion above. To this end, the invention operates in the RF domain rather than in the baseband video domain as is the case in the copy protection techniques and the copy protection disabling techniques discussed above. More particularly, the invention contemplates several methods and apparatus' for disabling the pseudo-sync, AGC and/or color stripe anti-copy signals using signal detection and signal modification techniques involving RF carrier signals modulated by the copy protection signals. The invention also contemplates the insertion of such copy protection signals onto a RF carrier signal in the RF domain.

An example of the present invention includes means for detecting or demodulating the RF carrier signal which is modulated by the copy protection signals. A pulse coincident with each color burst is derived from the demodulated or detected signal, which provides the location of the copy protection signals throughout the video field, including the vertical blanking interval. Alternatively, the pulse coincident with the RF modulating color burst can be derived via a bandpass filter and one-shot multivibrator. Since the last color burst occurs just before the start of the vertical blanking interval, it can be used to locate additional associated pulses in the vertical blanking interval, in which the anti-copy signals are embedded. The derived pulses then are used as timing control signals which time the operation of a respective one of various RF carrier modifying means in accordance with the invention combination. Each modifying means perform a modification, replacement, etc., of the anti-copy signals in the detected lines, which sufficiently disables the associated copy protection to allow the subsequent recording of an acceptable copy of the respective video signal.

In a copy protection system utilizing pseudo-sync and/or AGC anti-copy pulses for modulating the RF carrier, the RF carrier modifying means may comprise apparatus and method thereof for attenuating, suppressing, level shifting, etc., the anti-copy signals when demodulated. Another modifying means in the RF domain includes effectively narrowing the anti-copy pulse modulation envelope via suitable attenuation, and/or by adding or subtracting the RF carrier, whereby subsequent demodulation of the modified anti-copy signals in for example a VCR, proceeds normally to permit an acceptable recording. For example, the depth of modulation of the copy protection signals may be selectively altered to remove their affect. A further modifying means provides for effectively replacing the modulated RF carrier signal with another selected RF carrier or video signal and/or adding or subtracting a RF modifying signal to or from the modulated RF carrier signal to thereby replace, attenuate or distort the latter carrier signal with another signal or voltage level such that a recordable copy subsequently may be made.

In a copy protection system utilizing the color stripe effect for modulating the color burst RF carrier, the RF carrier modifying means may comprise means for altering and/or narrowing the depth of modulation of the modulated color stripe burst RF envelopes or for phase shifting the color stripe burst RF envelope to sufficiently correct the color burst phase so that it is properly demodulated when subsequently recorded. A further modifying means includes means for regenerating the RF carrier of the respective television channel, and means for regenerating the sideband frequency formed of the carrier frequency plus the color burst frequency as for example with a color burst phase lock loop which averages out phase errors in the color stripe burst. The two regenerated RF signals then are summed in the RF domain to produce a correct RF modulating color subcarrier signal. This color subcarrier signal in the RF domain then is used to replace the original RF modulating color stripe signal during the intervals of the color stripe anti-copy signals in response to the timing control signals of previous mention, to thereby defeat or weaken the color stripe effect in a subsequent recording process.

A further modifying means for disabling the color stripe effect in the RF domain is to apply means for mixing or heterodyning the color stripe burst modulation with a phase shifted harmonic of the sideband frequency (the RF carrier plus the color burst frequency), followed by means for low pass filtering, to disable the effects of the color stripe bursts. Alternatively, the frequency of the modulated RF carrier corresponding to the copy protection signals may be modified to provide a frequency which is outside the normal frequency band, whereby the tuner in a record VCR will not respond sufficiently to allow the copy protection signals to be effective.

Examples of the various methods and circuits for defeating the copy protection systems in the RF domain in accordance with the present invention, are fully described in the following detailed description. The addition of such copy protection signals in the RF domain is also described.

BRIEF DESCRIPTION OF THE DRAWINGS

FIGS. 3A, 3B are a combined block and circuit diagram of another embodiment in accordance with the invention.

DETAILED DESCRIPTION OF THE PREFERRED EMBODIMENTS

Figure 1:
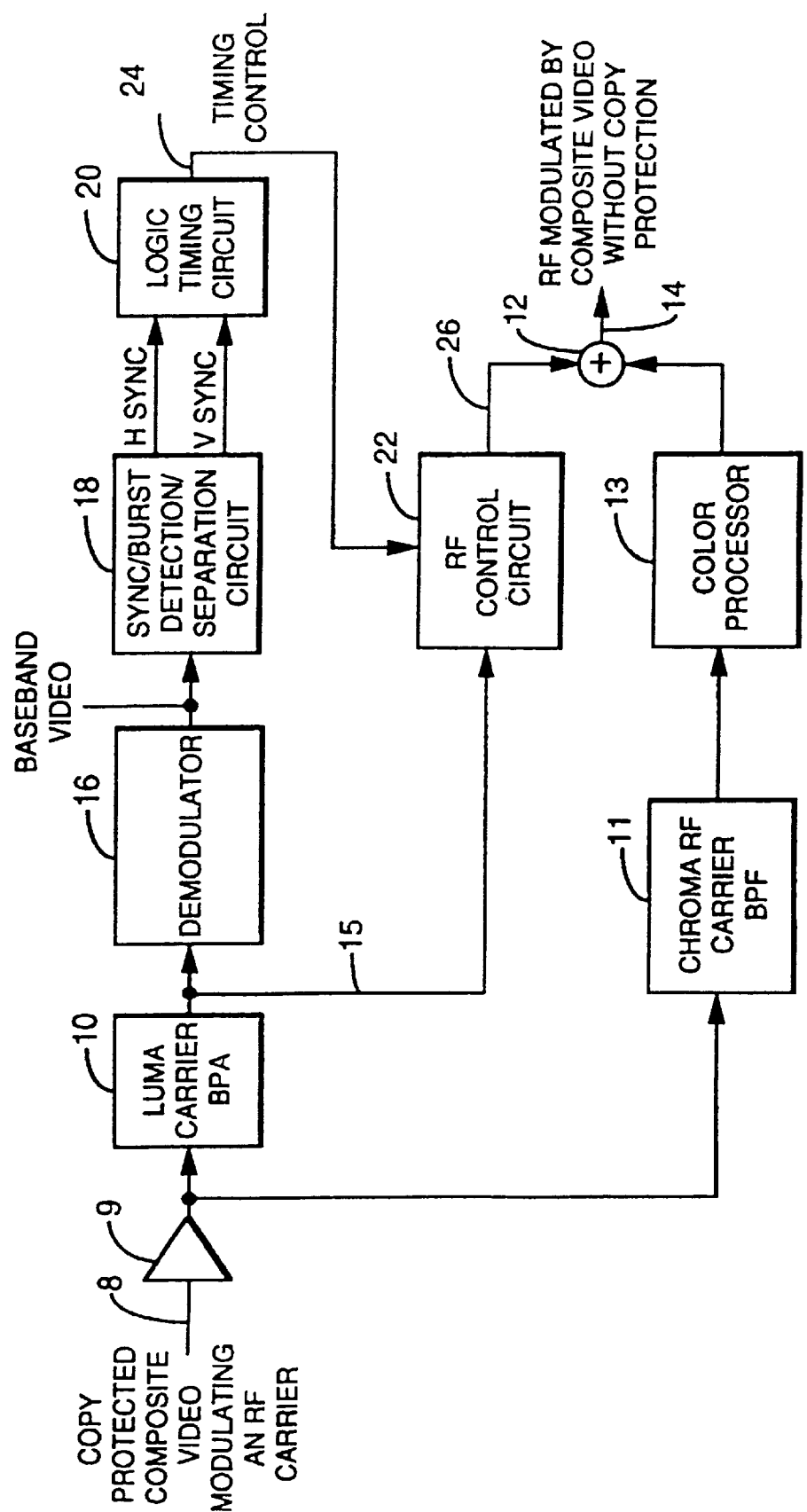
FIG. 1 is a block diagram depicting the basic combination of the invention, including the pertinent RF carrier signals.

FIG. 1 illustrates the basic combination of the present invention for disabling copy protection signals embedded in a video signal to inhibit the copying thereof, wherein the invention performs in the RF domain (for example in a dual VCR for RF to RF dubbing) rather than in the baseband video domain typically employed in the prior art of previous discussion. FIG. 1 includes circuitry illustrating the application of an RF carrier modulated by a composite video signal in which the copy protection signals are modulated onto the RF carrier to prevent copying . The FIG. 1 also illustrates the extraction of the signal component containing the copy protection signals, which signal component is the signal employed herein in the description to describe the various means of the invention for disabling the copy protection signals. In all of the figures, similar components and signals are similarly numbered and/or labeled.

As depicted in the FIG. 1, a RF carrier signal modulated by a composite video signal and containing copy protection signals, is supplied on a lead 8 to a luminance RF carrier bandpass filter (BPF) 10 and to a chrominance RF carrier BPF 11 via a suitable amplifier 9. The latter BPF 11 supplies a chrominance signal to a summing circuit 12 via a conventional color processor circuit 13. The chrominance signal path is illustrated herein to show the manner in which the color signal is reassembled with the RF carrier signal in which the copy protection signals have been removed or otherwise defeated in accordance with the invention, to provide a RF carrier with modulating composite video signal or an output lead 14.

The RF carrier signal containing some form of modulating copy protection signals such as discussed above, is supplied via the luminance BPF 10 and a lead 15 to a demodulator circuit 16 which may be an FM, AM or other type of demodulator commensurate with the modulated RF carrier signal. Thus, an RF carrier signal supplied by a playback VCR or satellite transmission is a frequency modulated signal, while a RF carrier signal from a television channel or cable, that is, off-air, is an amplitude modulated signal. Circuits 11 and 13 are generally used for VCR RF to RF dubbing process previously mentioned.

To illustrate, FIG. 1A exemplifies a waveform of a television line including a vertical blanking interval (VBI) and depicting an RF carrier signal of, for example, 61.25 megahertz (MHz), which is the broadcast frequency for channel 3 used hereinafter in the description of some of the invention embodiments, wherein the RF carrier signal is amplitude modulated by a video signal using, in this instance, a negative modulation process. It follows that the peak white value of the video signal minimizes the RF carrier signal while the sync tip value maximizes the RF carrier signal, as depicted in the FIG. 1A. It is this RF carrier signal, modulated by given copy protection signals such as, for example, those disclosed in the patents referenced above, that is utilized in accordance with the invention in the RF domain to defeat the effect of the copy protection signals.

Figure 1A:
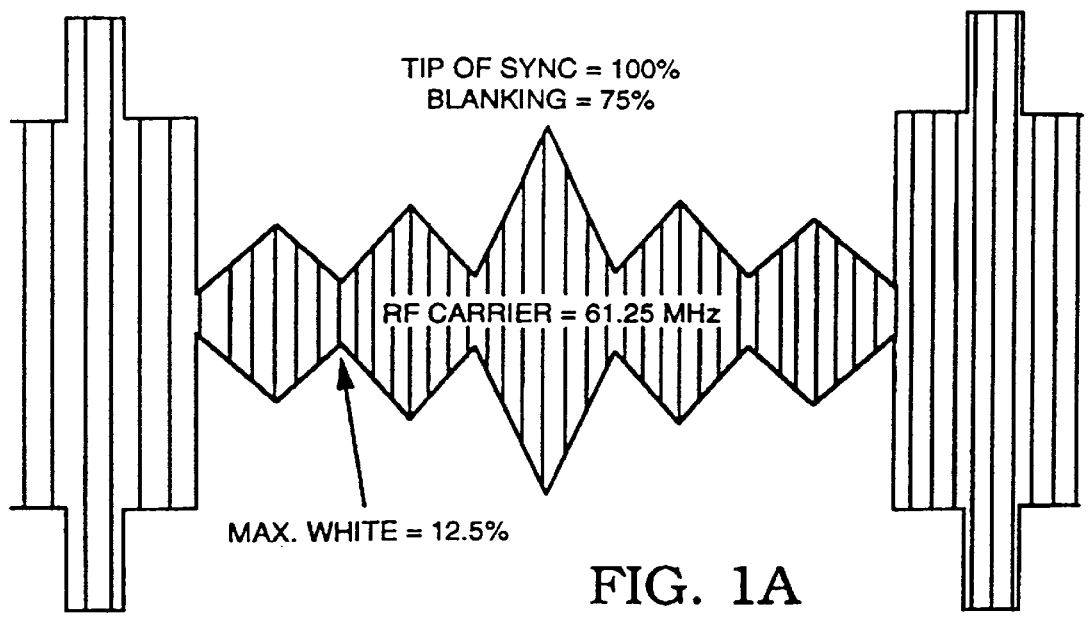
FIGS. 1A, 1B depict a typical amplitude modulation (AM) and frequency modulation (FM), respectively, of video signals for an RF carrier signal.
Figure 1B:
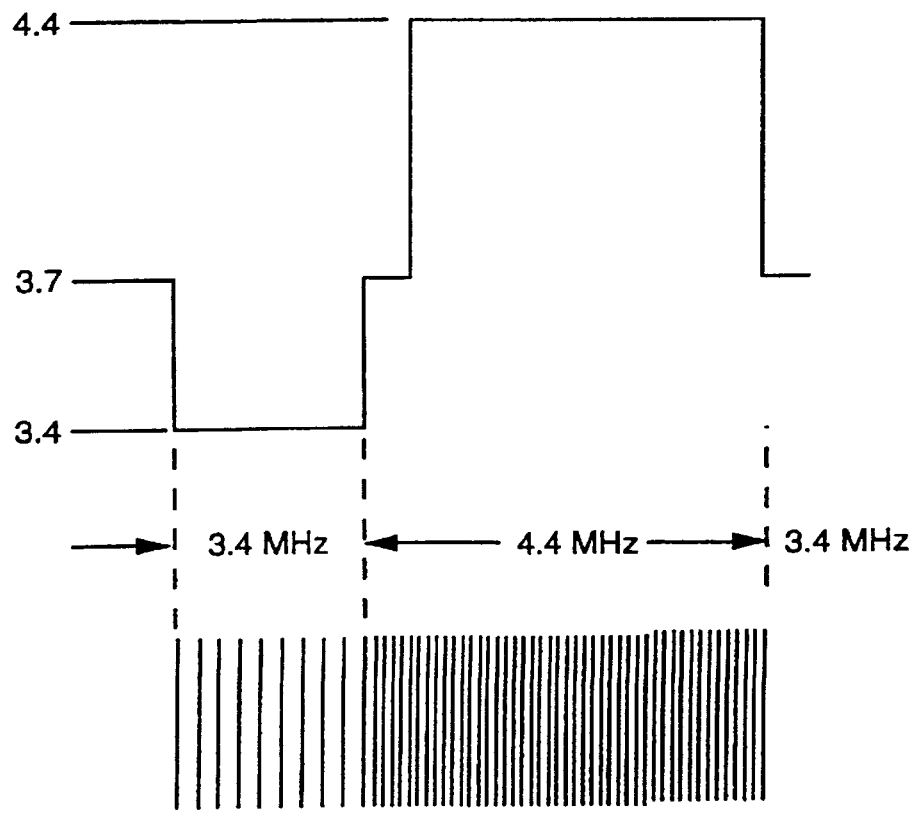

Similarly, FIG. 1B exemplifies a television line waveform with a VBI, depicting an RF carrier signal which is frequency modulated by a video signal, such as supplied by a playback VCR, satellite transmission, etc. As depicted, the sync period is represented by a 3.4 MHz frequency, the blanking level by 3.7 MHz frequency and peak white level by 4.4 MHz frequency. As mentioned above, the RF carrier signal is utilized in the invention combination to detect and defeat the modulating copy protection signal in the RF domain.

Figure 1C:
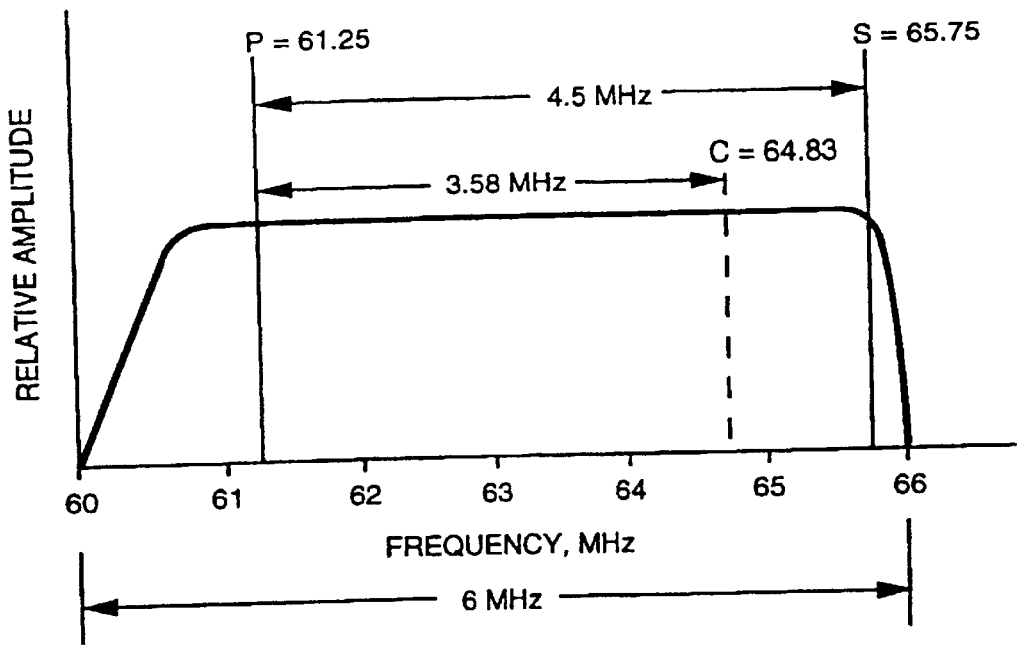
FIG. 1C depicts a RF frequency spectrum of the AM video signal.

FIG. 1C illustrates a typical RF frequency spectrum of an amplitude modulated video signal on the picture or visual RF carrier frequency of 61.25 MHz, in this example as shown in FIG. 1A. The modulating chroma signal is 3.58 MHz above the picture RF carrier frequency and thus is 64.83 MHz. The modulated aural RF carrier is 4.5 MHz above the picture RF carrier and thus is 65.75 MHz.

Figure 1D:
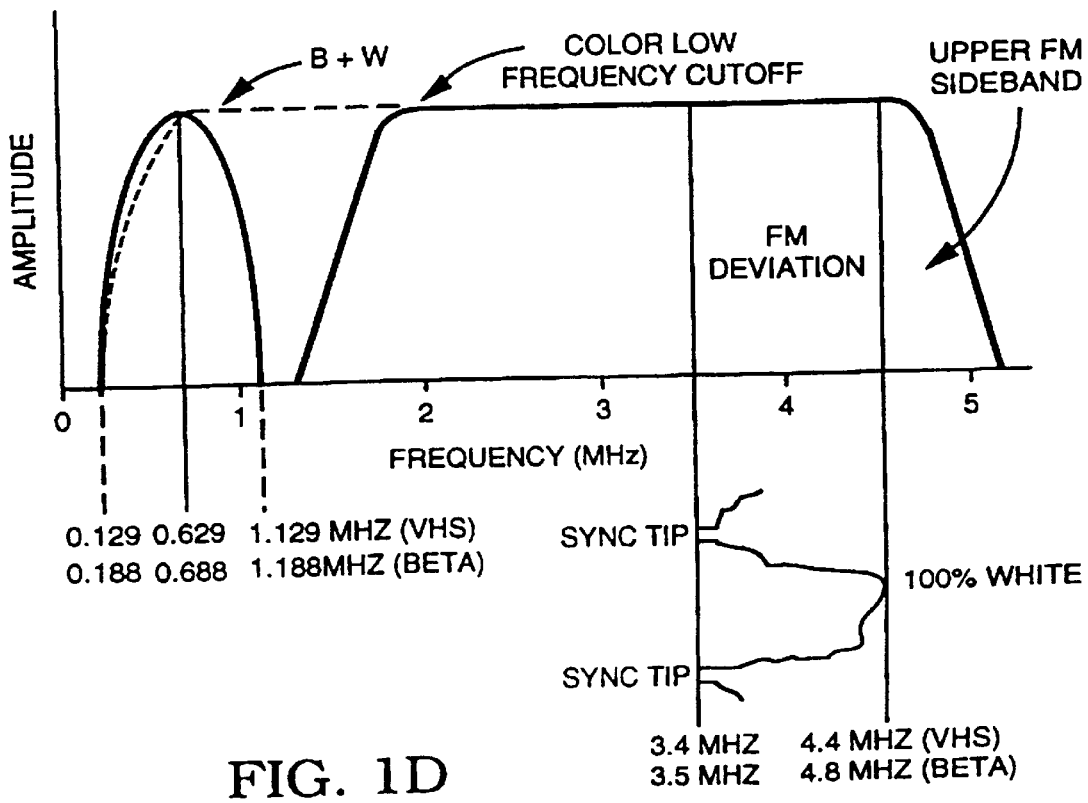
FIG. 1D depicts an FM recording system with the RF carrier frequency spectrum.

FIG. 1D illustrates a RF frequency spectrum of a typical frequency modulated recording system (FIG. 1B) such as supplied, for example, for a VHS or Beta video recorder. The luminance signal is depicted and the sync tip of the baseband video signal is modulated to 3.4 MHz (VHS). The peak white of the baseband video signal is modulated to 4.4 MHz (VHS). In essence, the recorder system is a voltage-to-frequency converter while the playback system is a frequency-to-voltage converter. It is noted that the chroma signal of the baseband video signal centered around 3.58 MHz is frequency converted to a lower frequency of, for example, 629 kilohertz (KHz) and is recorded onto the medium.

Continuing now with FIG. 1, the demodulated baseband video signal from the demodulator circuit 16 is supplied to a sync/burst detection/separation circuit 18 which generates vertical sync (V sync) signals at vertical or field rate, horizontal sync (H sync) signals at horizontal line rate, or color burst signals. The signal is supplied to a logic timing circuit 20 which supplies a timing control signal to a RF control circuit 22 on a lead 24. The original RF carrier signal with modulating copy protection signals, that is, anti-copy pulses or color stripe signals, also is supplied to the RF control circuit 22 via the lead 15. The RF control circuit 22 is steered by the timing control signal on the lead 24 to selectively modify the incoming RF carrier signal in one of various techniques in accordance with the invention, such that the output RF carrier signal supplied to the summing circuit 12 via an output lead 26 no longer contains effective copy protection signals. That is, the anti-copy pulses or color stripe signals have been removed and/or disable to enable a subsequent acceptable recording of the respective video signal. As previously mentioned, the copiable luminance signal on lead 26 is combined with the chroma signal by the summing circuit 12 to provide the composite video signal without copy protection on the output lead 14. Various methods and circuits for performing the modification to the RF carrier in accordance with the invention are illustrated and disclosed with reference to the following FIGS. 1E, 2–5.

Figure 1E:
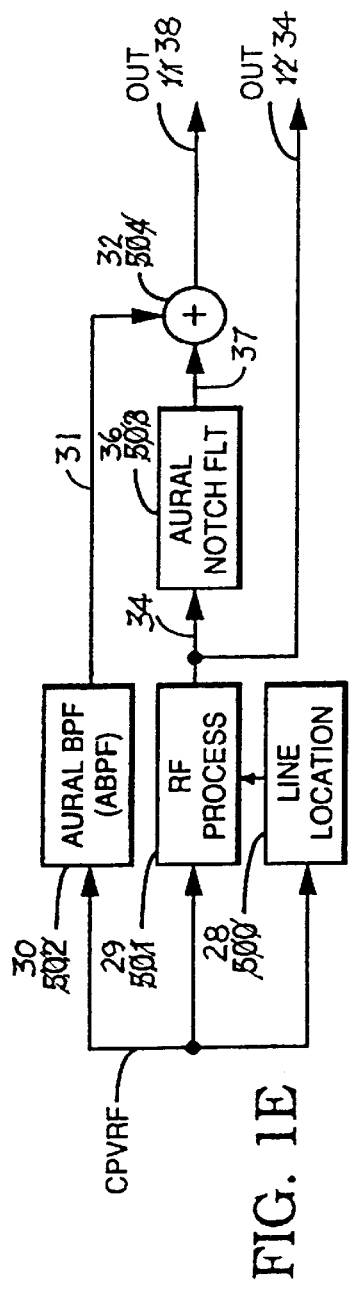
FIG. 1E depicts a generalized block diagram for defeating pseudo-sync and/or AGC and/or color stripe copy protection signals in an AM RF domain.

FIG. 1E illustrates a system for defeating copy protection signals in the AM RF domain while further preserving the aural RF carrier portion of a modulated RF carrier signal if as may happen, the aural RF carrier is degraded by the copy protection defeating process. To this end, copy protected video that has AGC and pseudo sync/and or color stripe burst protection signals is amplitude modulated on an RF carrier to provide, for example, the modulated RF carrier signal on lead 15 of FIG. 1. The signal is supplied to a line location/timing circuit 28, to a RF carrier processing circuit 29 and to an aural RF carrier BPF 30. The line location/timing circuit 28 corresponds to the circuits 16, 18, 20 of FIG. 1 and provides a timing control signal similar to that on the lead 24. The RF carrier processing circuit 29 is the equivalent of the RF control circuit 22 of FIG. 1, and combines with the circuit 28 of FIG. 1E to sufficiently defeat the AGC and/or pseudo sync and/or color stripe burst that has been modulated onto the RF carrier, as is fully described hereinbelow in FIGS. 2, 4, 5. Defeating the modulated copy protection signals may cause some degradation in the aural RF carrier portion of the RF carrier signal. To preserve the aural RF carrier, the band pass filter 30 is used to supply via a lead 31 just the aural RF carrier signal (FM audio 4.5 MHz above the visual carrier, for example) to a summing circuit 32. The output of the processing circuit 29 on a lead 34 is a modulated video with defeated modulated copy protection signals but with a possibly degraded aural RF carrier. The output on lead 34 is supplied to an aural carrier notch filter 36. The output of filter 36 is RF modulated video on a lead 37 with the modulated copy protection signals defeated sufficiently, and with no, or little, aural RF carrier. The summing circuit 32 combines the RF carrier signals on leads 31, 37, to yield an output RF carrier signal on a lead 38 with program video and audio RF carriers intact but with modulated copy protection signals defeated.

It may be seen that circuits 30, 32 and 36 are optional if audio quality in the RF carrier signal supplied by the processing circuit 29 is adequate. Thus, the RF carrier signal on the lead 34 is an alternative output for the RF carrier signal on the lead 38.

The circuit of FIG. 1 further illustrates the means by which a video signal modulated RF carrier signal can be modified in the RF domain to add copy protection signals onto the RF carrier signal. To this end, the RF control circuit 22 of FIG. 1 may be used to insert as, for example, by modulating, RF carrier signals to replace or modify portions of the RF carrier envelope such that when the RF carrier signal on the lead 26 is demodulated, copy protection signals will appear to prevent copying. Basically, the RF carrier signal on the lead 15 in, for example an AM system, is modulated with a video signal not containing copy protection pulses, and is supplied to the corresponding (AM) demodulator circuit 16 and the RF control circuit 22. The circuits 18 and 20 generate baseband copy protection signals on the lead 24 to modify the RF carrier envelope in the circuit 22. For instance, portions of the RF carrier signal are enhanced in amplitude to generate pseudo-sync signals modulating the coincident RF carrier, while portions of the RF carrier signal following this enhanced carrier amplitude are diminished to generate AGC pulses modulating the coincident RF carrier. The RF carrier signal on the lead 26 then contains copy protection signals modulating an RF carrier. Other copy protection signals such as, for example, the color stripe burst signals of previous discussion above, and disclosed in the U.S. Pat. No. 4,577,216 of previous mention, may be applied in a similar manner in the RF domain.

If FIG. 1 is an FM system, then the RF control circuit 22 will be used to modify the carrier frequency of the RF carrier signal on the lead 15, whereby portions of the RF carrier will be decreased in frequency to represent pseudo-sync signals frequency modulating the coincident RF carrier, followed by portions of the RF carrier that are increased in frequency to represent AGC pulses frequency modulating the coincident RF carrier.

Figure 2:
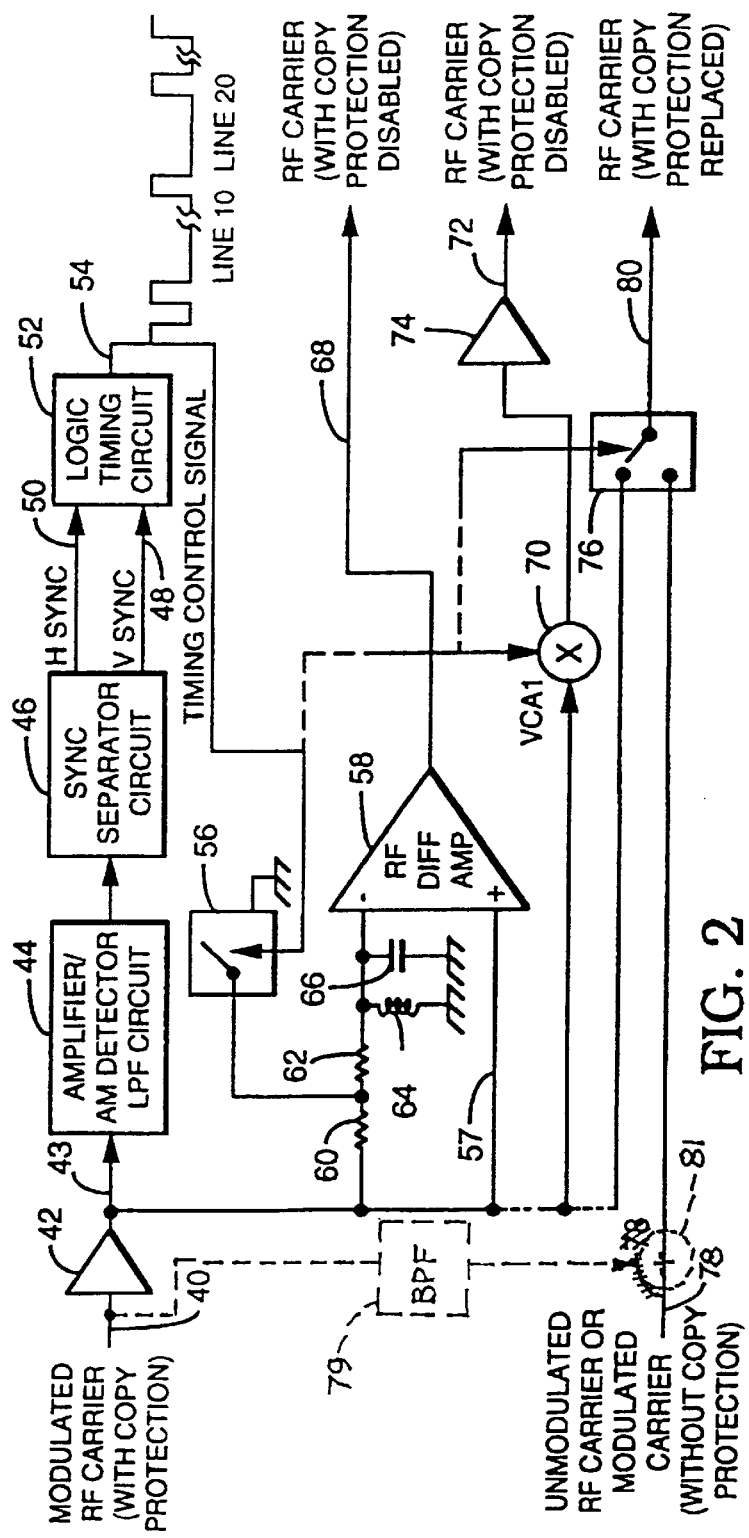
FIG. 2 is a combined block and circuit diagram of several embodiments in accordance with the present invention.

FIG. 2 illustrates in further detail alternative embodiments of the invention of FIG. 1, which embodiments receive an RF carrier signal via a television transmission channel, that is off-air, or via a cable system, etc., which RF carrier signal has been, by way of example only, AM modulated to include copy protection signals which inhibit the copying of the respective video signal. In this example, the RF modulated carrier signal includes a carrier of 61.25 megahertz (MHz) and an aural FM carrier signal of 65.75 MHz as depicted in FIG. 1C, as well as the copy protection signals. The modulated RF carrier signal with copy protection signals is supplied via a lead 40 to an amplifier 42, whose output is supplied via a lead 43 to an amplifier/AM detector/low pass filter circuit 44. The AM detector portion of the circuit 44 provides recovery of the baseband video signal, while the low pass filter at the output of circuit 44 removes the residual visual carrier frequency from the baseband video signal. The resulting baseband video signal is supplied to a sync separator circuit 46 which provides at its outputs a horizontal sync (H sync) signal or pulse and a vertical sync (V sync) signal or pulse on respective leads 50, 48. The H sync signal on lead 50 thus includes pseudo-sync anti-copy signals or pulses as well. Leads 48, 50 are coupled to a logic timing circuit 52 which generates a signal indicative of the presence of the television lines which contain the copy protection signals. Thus, circuit 52 effectively comprises a line locator circuit which generates, for example, a low logic level on a lead 54 during an active video line in which anti-copy signals are present which, in the example herein, are lines 10 through 20 in the vertical blanking interval. A high logic level is provided on the lead 54 during the presence of the normal sync and color burst signals in the vertical blanking interval as well as during the active television field. Lead 54 is coupled to a control input of a RF switch 56.

By way of background, certain portions of a normal viewing field defined by a video signal typically are not used for defining the actual picture. More specifically, the horizontal scan lines immediately adjacent to those portions of a video signal defining vertical blanking intervals are not used in typical television monitors or sets to define the picture. Therefore those signal portions immediately adjacent to vertical blanking intervals are also available in their entirety for the addition of copy protection signals. Thus, insofar as this invention is concerned, such signal portions are also considered part of the vertical blanking intervals, and the term "vertical blanking interval" as used herein encompasses the same.

The modulated RF carrier signal supplied by the amplifier 42 also is supplied via the lead 43 to an aural RF carrier notch filter circuit 57. To this end, lead 43 is coupled to a positive input of a RF differential amplifier 58 and to a filter network, formed of resistors 60, 62 inductor 64 and capacitor 66, which network thence is coupled to an inverting input of the RF differential amplifier 58. The notch filter circuit 57 herein is used to prevent degrading the aural RF carrier while providing for the defeat of the copy protection signals used to modulate the RF carrier signal. The junction of the resistors 60, 62 is coupled to one terminal of the RF switch 56. A second terminal of the switch 56 is coupled to ground. The output of the RF differential amplifier 58 provides an output signal from the circuit of FIG. 2 on a lead 68, which output signal comprises a RF carrier signal in which the copy protection signals have been attenuated and which thus can be supplied to a recording VCR to provide an acceptable copy of the video signal.

To this end, the RF switch 56 is maintained in an off condition by the low logic level on the lead 54 during the active video lines 10 through 20 when the copy protection signals are present. During this portion of the vertical blanking interval, the notch filter circuit 57 is active to thereby prevent degrading the aural RF carrier, while the video RF carrier signal envelope is severely attenuated in the line intervals when the RF carrier modulating anti-copy signals are present. The attenuated RF carrier is supplied as the output signal on the lead 68. During the video lines and the active television field when the copy protection signals are absent, the RF switch 56 is coupled to ground via a high logic level on lead 54 to disable the notch filter circuit 57. During this interval, the original RF carrier signal on lead 43 is supplied as the output of the RF differential amplifier 58 on the lead 68. Thus, combining the two signals provides a modified or re-assembled video modulated RF carrier signal without the anti-copy signals, when demodulated subsequently as, for example, by a record VCR. It may be seen that, in this embodiment of the invention, the RF envelope is attenuated when the copy protection signals are present without affecting the aural RF carrier signal that is at a frequency of about 4.5 MHz above the visual RF carrier frequency, which is an additional advantage of the above embodiment of FIG. 2.

In an alternative technique employing in part the circuitry in FIG. 2, the notch filter circuit 57 and RF switch 56 are dispensed with and the modulated RF carrier signal on the lead 43 is supplied (via a dashed line portion) to an input of a RF voltage control amplifier or modulator 70. The line location, i.e., timing control, signal from the logic timing circuit 52 is supplied via the lead 54 (and a dashed line portion) to a control input of the RF modulator 70. Thus, during the active video lines, for example, lines 10–20, in the vertical blanking interval, the peak envelope of the anti-copy signals modulating the RF carrier may be suppressed via the RF modulator 70 in response to the signal on the lead 54. It follows that a re-assembled RF carrier signal is provided on an output lead 72 via an amplifier 74 in which the copy protection signals are disabled. In this embodiment, the aural RF carrier signal may be somewhat attenuated during suppression or attenuation of the RF envelope of the anti-copy signals. However, the aural RF carrier signal should still be sufficient in amplitude to not cause momentary losses of the audio signal, i.e., audio "drop outs".

In a further alternative technique employing in part the circuitry of FIG. 2, the notch filter circuit 57, the RF switch 56 and/or the RF modulator 70 are dispensed with and the modulated RF carrier signal on lead 43 is supplied (via a dashed line portion) to an input terminal of a RF switch 76. A second RF source such as a RF carrier modulated by a noisy color signal, a RF carrier modulated by a color bar signal, an unmodulated RF carrier or a modulated RF carrier or other signal without sufficient anti-copy signals, is supplied via a lead 78 to a second terminal of the RF switch 76. The second replacement signal may in fact be no signal at all, including an RF signal of sufficiently low value which likewise induces a dropout during the period of the copy protection signals, which effectively blanks them out. In this alternative, the line location signal on the lead 54 is supplied to the RF switch 76 as a switch timing control signal, whereby the modulated RF carrier signal on lead 43 is replaced during the period of the copy protection signals with one of the selected RF signals on lead 78 which lacks any copy protection signals. The resulting re-assembled output signal on an output lead 80 of the RF switch 76 thus does not contain anti-copy signals whereby acceptable recordings can be made of the video signal. Alternatively, an aural band pass filter 79 and summing junction 81 may be employed to provide the aural RF carrier on the lead 78 from the lead 40 (as shown in a dashed line portion) so that there is no disruption in the aural RF carrier on output lead 80 when the RF switch 76 switches from the RF carrier signal on lead 43 to the replacement carrier signal on lead 78.

As previously discussed, the techniques and circuitry of FIG. 2 provide timing and modifying means operating in the RF domain for disabling copy protection signals previously embedded in a video signal using, in this instance, an AM recording process such as commonly done, for example, in an off-air video transmission or cable transmission system.

Referring to FIGS. 3A, 3B, the techniques and circuitry provide means operating in the RF domain for similarly disabling copy protection signals, but in a video signal derived via a FM recording system such as, for example, a dual deck videotape recorder system (i.e., VCR) employing RF to RF dubbing, or via a satellite system, etc. To this end, in FIG. 3A a luminance RF carrier signal which is frequency modulated (FM) is supplied to a preamplifier/equalizing amplifier circuit 90 via an input lead 92 and thence to a limiter amplifier/FM detector circuit 94. The resulting baseband video signal is supplied to a lowpass filter/de-emphasis circuit 96 wherein the signal is filtered and de-emphasized to provide a baseband video luminance demodulated signal for input to a sync separator circuit 98 and to provide the luminance demodulated signal on a lead 100. The sync separator circuit supplies a composite H sync with anti-copy pseudo-sync signals via a lead 102, and a V sync signal via a lead 104.

The composite H and pseudo-sync signal is supplied to a non-retriggerable one-shot multivibrator 106 of about 50 microseconds, which supplies a pulse to an AND gate 108 which begins at the trailing edge of H sync and extends to the end of an active horizontal television line. Thus, the non-retriggerable one-shot 106 provides a signal which is indicative of the presence of active television line pixels. The one-shot 106 also ignores triggering on the anti-copy pseudo-sync pulses. The V sync signal is supplied to a one-shot 110 of about 6 television lines duration, and thence to another one-shot 112 of about 10 television lines duration which generates a vertical rate pulse that is, for example, logic high from television lines 10 through 20 and thus is a logic high during the presence of RF carrier modulated by the anti-copy pulses in the lines. The output of one-shot 112 is supplied to the AND gate 108 which provides a line locator signal, via a lead 114 that is a logic high during the presence of pseudo-sync and AGC pulses, excluding however, normal H sync pulses.

Referring to FIG. 3B, the luminance demodulated signal on lead 100 (FIG. 3A), is supplied to a video clamping circuit 116, which clamps the luminance signal to sync tip voltage and supplies the signal to one terminal of a switch 118. The other terminal of the switch 118 is grounded. The line locator signal on the lead 114 from FIG. 3A is used to control the switching of the switch 118. The output of switch 118 is coupled to an inverting input of a comparator amplifier 120 and a non-inverting input of a comparator amplifier 122. The non-inverting and inverting inputs of comparator amplifiers 120, 122, respectively, are coupled to threshold voltages Vb1 and Vb2. In response to the line locator signal on lead 114, a clamped luminance signal is supplied to the comparator amplifiers 120, 122 during the presence of pseudo-sync and AGC pulses. Amplifiers 120, 122 in turn, generate logic high levels PS and AGC coincident with the RF carrier modulating pseudo-sync (PS) and AGC pulses, respectively, and output the corresponding logic signals on respective leads 124, 126, as well as to one input of respective AND gates 128, 130. The voltages Vb1 and Vb2 are selected commensurate with the sync tip voltage level and the AGC pulse voltage level, respectively. The PS and AGC logic signals also are supplied to pulse narrowing circuits 132, 134 respectively, each formed of resistors coupled to second inputs of respective AND gates 128, 130 and capacitors coupled from respective second inputs to ground. The AND gates 128, 130 supply narrowed pulse width logic signals NPS and NAGC from the respective PS and AGC signals, on leads 136, 138.

It is to be understood that the AGC anti-copy pulses alternatively may be clustered at selected timing positions along the "back porch" of the vertical blanking interval such as described in the U.S. Pat. No. 4,819,098 of previous mention, and that the present invention further contemplates the defeat of such clustered copy protection modifications to the video signal.

The line locator signal on lead 114 and signals PS, AGC, NPS and NAGC on leads 124, 126, 136, 138 respectively, are coupled as inputs to a logic combining circuit 140 which, in turn, supplies a timing control signal to a RF switch 142 via a lead 143. The luminance RF carrier signal of FIG. 3A is coupled via the lead 92 and a lead 144 to a terminal of the switch 142. A signal source generator 146, including an oscillator or an RF frequency source, is coupled via a jumper circuit 148 to a second terminal of the RF switch 142. The output terminal of RF switch 142 is coupled to a low pass filter 150 of about 7 MHz, which provides the output from FIGS. 3A, 3B on a lead 152.

During the period of RF carrier modulating anti-copy signals, e.g., pseudo-sync and/or AGC pulses, the luminance RF carrier signal on lead 144 to the RF switch 142 is replaced in response to the timing control signal from the logic combining circuit 140 by a signal supplied by the signal source generator 146 comprising a frequency that represents blanking level, an attenuated pseudo-sync amplitude or a narrowed pulse width pseudosync signal (when demodulated in a record VCR or satellite tuner). The replacement signal also may be no signal, or an RF signal of low value, whereby essentially a dropout is induced by the resulting reduced carrier level at the time of occurrence of the copy protection signals used to modulate the RF carrier signal, thereby effectively blanking them out. The timing control signal, in turn, is a reflection of the line locator signal on lead 114, and the PS signal on lead 124 or the NPS signal on the lead 136, respectively. The PS signal causes a pulse level shifting or attenuation affect while the NPS signals causes a pulse narrowing effect. Likewise, if the control signal AGC on lead 126 or NAGC on lead 138 are used along with the line locator signal on lead 114 to control the RF switch 142 via the logic combining circuit 140, the luminance RF carrier signal on lead 144 is replaced by a frequency which produces AGC pulses of attenuated amplitude or AGC pulses of narrowed pulse width, respectively, when demodulated in a record VCR or satellite tuner. Thus, the line locator signal on lead 114 is used to switch a RF signal into the luminance RF carrier signal to thus replace the portions of the television lines containing RF carrier modulating anti-copy signals with any active television line signal which would render recordable copies of the video signal when FM detected subsequently in a dubbing process. The re-assembled signal from the RF switch 142 is supplied to the low pass filter 150 which removes any discontinuities in the RF carrier waveform. The resulting re-assembled luminance RF carrier signal with copy protection signals disabled is supplied via the lead 152 to, for example, the RF luminance FM input of a record VCR, whereby an acceptable recording may be made.

An alternative technique employing the circuitry of FIGS. 3A, 3B, provides a shift or alteration in the frequency of the signal on lead 144 to cause a corresponding level shift in the copy protection signals when subsequently demodulated. To this end, the luminance RF carrier signal on lead 144 is supplied to a single sideband (SSB) modulator 154 and thence to a second input of the jumper circuit 148. An oscillator 156 of about 100 kilohertz (KHz) or more frequency is coupled to the SSB modulator 154. The modulator 154 is a single sideband AM modulator with an upper sideband output. Accordingly, when the output of the modulator 154 is switched into the luminance RF carrier signal in response to the line locator signal on the lead 114 and timing control signal on the lead 143, the positive frequency of the oscillator 156 effectively is added to the luminance RF carrier signal. As a result, the level of pseudo-sync pulses in the modified luminance RF carrier signal supplied to a record VCR via the output lead 152, will be level shifted when demodulated, thus allowing acceptable recordings to be made.

Figure 4:
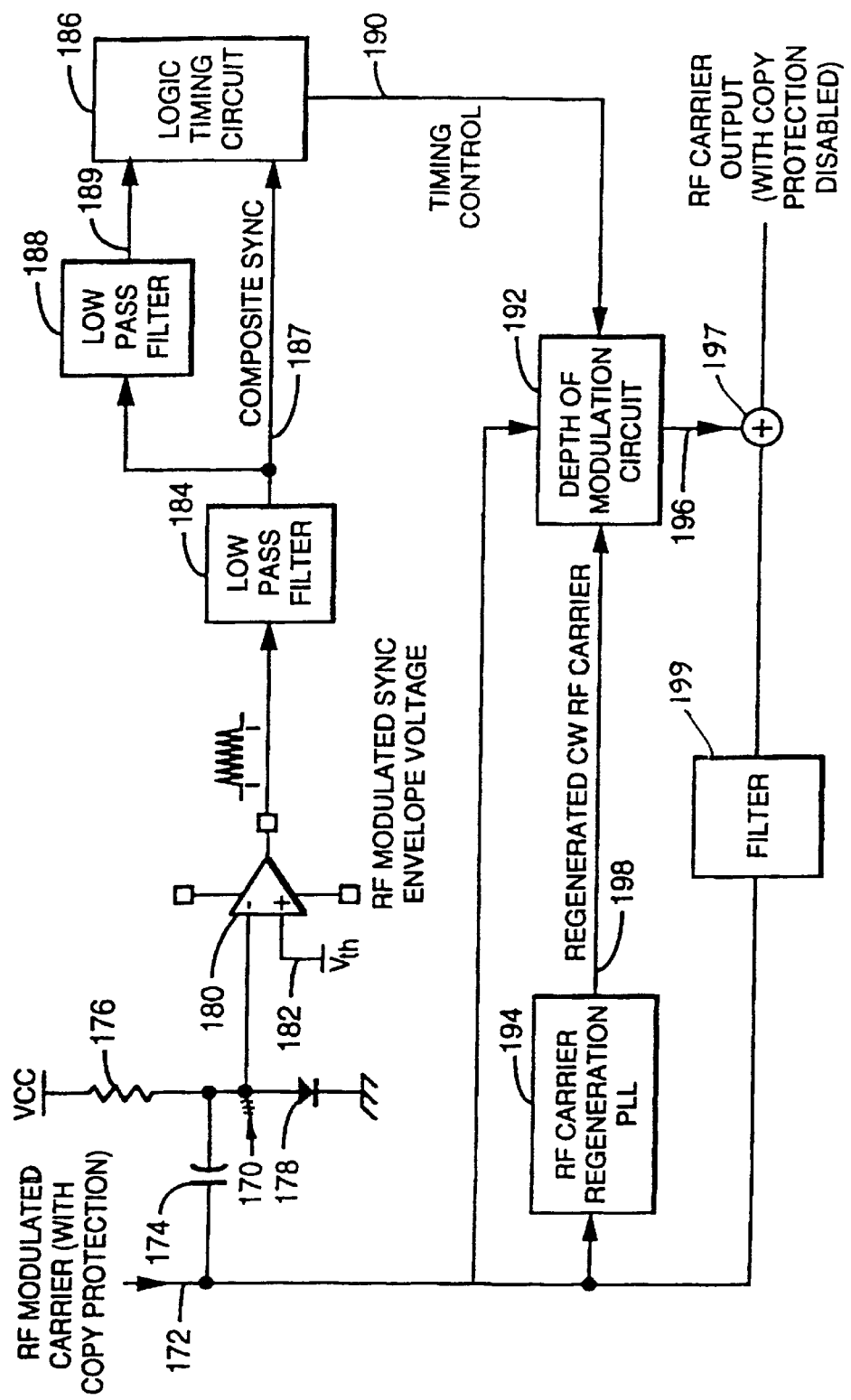
FIG. 4 is a combined block and circuit diagram of a further embodiment in accordance with the invention.

FIG. 4 depicts an alternative embodiment of the invention for removing copy protection signals from a copy protected modulated RF carrier signal using techniques in the RF domain. To this end, a modulated RF carrier signal such as derived from off-air via a television channel, cable system, etc., wherein the RF carrier has been AM modulated to include copy protection signals, is supplied to a DC restoration circuit 170 via a lead 172. The circuit 170 includes a capacitor 174, a resistor 176 and a diode 178 coupled at a common junction and thence to a non-inverting input of a comparator amplifier 180. The free ends of the resistor 176 and diode 178 are coupled to a supply voltage and to ground, respectively. The DC restoration circuit 170 thus DC restores the RF envelope to its peak value, i.e., the sync tip RF envelope value. The restored RF carrier signal is supplied to the comparator amplifier 180 which slices the peak RF just below its maximum as established by a threshold voltage Vth applied via a lead 182 to an inverting input of comparator amplifier 180. The comparator amplifier 180 supplies a burst of RF, coincident with the H sync and V sync which modulate the RF carrier signal, to a low pass filter 184. The filter 184 filters out the RF components to supply a baseband composite sync signal including H sync, V sync and pseudo-sync signals to a logic timing circuit 186 and to a second low pass filter 188, via a lead 187. The filter 188 retrieves the V sync signal and supplies it to the logic timing circuit 186 via a lead 189. The latter circuit 186 generates on a lead 190 a timing location or timing control signal which identifies the location of the video lines and associated RF carrier modulating anti-copy signals, i.e., the pseudo-sync and AGC pulses.

The modulated RF carrier signal on the lead 172 also is supplied to a depth of modulation circuit 192, and to a RF carrier regeneration circuit 194 which thence also is coupled to the circuit 192. The RF carrier regeneration circuit 194 includes a phase lock loop (PLL) and generates on a lead 198 a continuous wave RF carrier of constant value and of a frequency similar to the frequency of the modulated RF carrier signal on lead 172. The depth of modulation circuit 192 provides means for changing the depth of modulation of the RF carrier envelope in response to the timing location signal on lead 190, and for then supplying the modified RF carrier signal to a summary circuit 197 via an output lead 196. Thus, in response to the timing location of the RF carrier modulating pseudo-sync pulses, and/or the AGC pulses, the depth of RF carrier modulation can be changed by the circuit 192 to add or subtract the continuous wave carrier of the regeneration circuit 194 to or from the modulated RF carrier signal on lead 172 and filter circuit 199 during the timing intervals of the pseudo-sync or AGC pulses. The alterations in the depth of RF carrier modulation can be achieved by making changes in the gain, or by level shifting, blanking, narrowing, and/or adding or subtracting RF carrier to the embedded anti-copy signals. In this manner, the pulses which prevent copying are modified to make them subsequently transparent to the various circuits of, for example, a record VCR coupled to the output lead 196, thereby allowing acceptable recordings of the video signal in accordance with the invention.

In an alternative modification to FIG. 4, the low pass filter to retrieve the composite H and pseudo-sync pulses can be replaced by using instead a one-shot multivibrator timing circuit to trigger a pulse at the output of the comparator amplifier 180. Furthermore, if the copy protected modulated RF carrier is large in signal level, the comparator amplifier 180 can be replaced by a diode or transistor to perform partial RF envelope or power detection to effectively achieve the results of the amplifier 180.

Figure 4A:
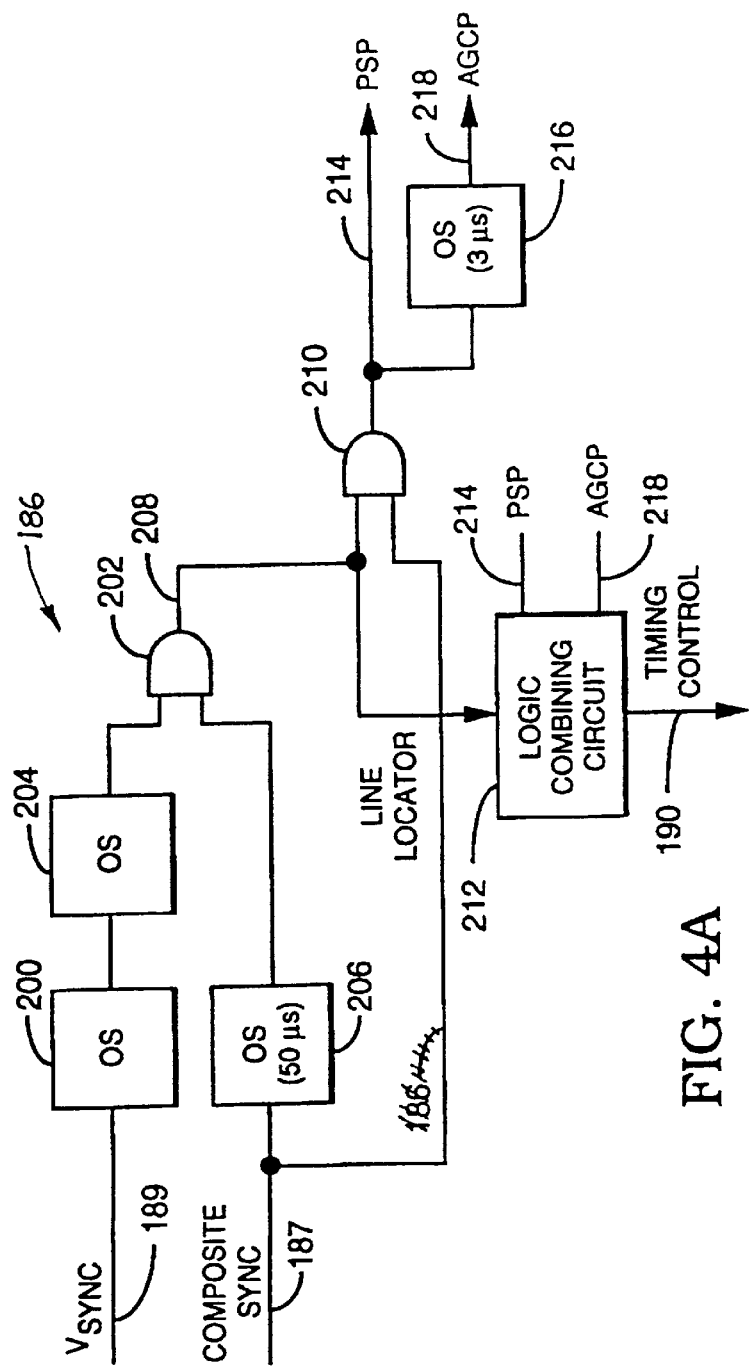
FIG. 4A is a block diagram illustrating further details of a logic timing circuit of the invention of FIG. 4.

FIG. 4A illustrates further details of the logic/timing circuit 186 of FIG. 4, wherein similar components are similarly numbered and labeled. Thus, the V sync signal from the low pass filter 188 (FIG. 4) is supplied via the lead 189 to a one-shot multivibrator 200 and thence to an AND gate 202 via a second one-shot multivibrator 204. Likewise, the composite sync signal from the low pass filter 184 (FIG. 4) is supplied via the lead 187 to a one-shot multivibrator 206 and thence to the AND gate 202. The one-shots 200, 204 and 206 have time durations of about 6 television lines, about 10 television lines and 50 microseconds, respectively. The one-shot 206 is triggered by the trailing edge of each H sync pulse but is immune to the edge of pseudo-sync pulses. The signal from the one-shot 204 comprises vertical rate pulses indicative of active television lines 10 through 20 modulating the RF carrier, while the signal from the one-shot 206 is indicative of the active television line pixels modulating the RF carrier. An output lead 208 from the AND gate 202 provides a line locator signal formed of logic high pulses which are coincident with the AGC and PS pulses but not necessarily with normal H sync pulses modulating the RF carrier. The line locator signal on the lead 208 is indicative of active television line pixels in or adjacent to the vertical blanking interval for lines 10 through 20 containing the anti-copy pulses. As may be seen, the components 200–206 are similar to the components 106–112 of FIG. 3A, and the line locator signal on lead 208 is similar to the line locator signal on the lead 114 and is used for similar purposes.

The composite sync signal, with PS pulses, also is supplied to an AND gate 210, and the line locator signal on the lead 208 is supplied to the AND gate 210 as well as to a logic combining circuit 212. The AND gate 210 supplies logic high pulses PSP coincident with PS pulses on a lead 214, and also provides an input to a one-shot multivibrator 216 of 3 microseconds duration, which then supplies pulses AGCP coincident with AGC pulses on a lead 218. The PSP and AGCP logic level pulses on leads 214, 218 are supplied as timing signals to the logic combining circuit 212 along with the line locator signal on lead 208. The logic combining circuit 212 supplies the timing control signal of previous description in FIG. 4 on the lead 190, which signal is coincident with the RF carrier modulated by AGC and PS pulses in the associated television lines.

Figure 4B:
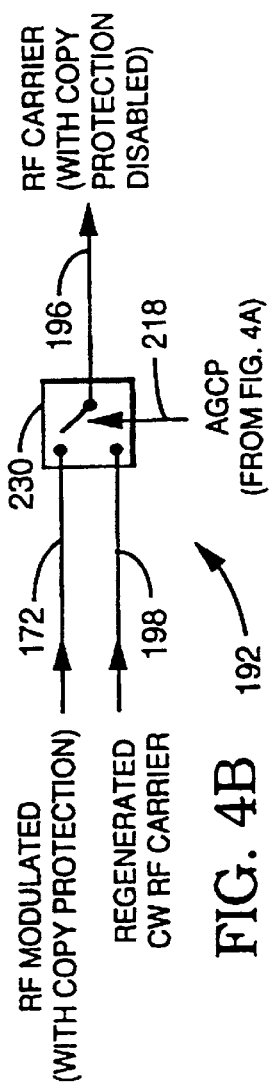
FIGS. 4B–4D are block diagrams illustrating further details of alternative depth of modulation circuits of the invention of FIG. 4.

FIG. 4B depicts an example of the depth of modulation circuit 192 of FIG. 4, which example depicts a switching circuit 230 that enables changing the depth of RF carrier modulation of the incoming modulated RF carrier signal containing copy protection, which is supplied via the lead 172 of the FIG. 4. To this end, the AGCP signal on lead 218 of FIG. 4A is supplied to control the switching circuit 230 such that the regenerated continuous wave RF (visual) carrier signal on lead 198 of FIG. 4, preferably including the aural RF carrier from the signal on the lead 172, is gated into the modulated RF carrier signal during the time that modulated AGC pulses are present in the former signal. Thus, the switching circuit 230 "fills in" the RF carrier which is pinched off by the modulating anti-copy AGC pulses. The resulting RF carrier signal on the output lead 196 of previous mention in FIG. 4, has a reduction in the depth of modulation during the period of the RF carrier modulated by AGC pulses. It follows that in a subsequent recording process of the respective video signal, the altered or suppressed AGC pulses allow the recording of an acceptable copy. Alternatively, the signal on lead 198 can be the aural RF carrier only, whereupon the output signal on the lead 196 contains blanked or attenuated visual RF carrier during the period that the RF carrier modulating copy protection signals are present in the RF carrier signal on the lead 172.

Figure 4C:
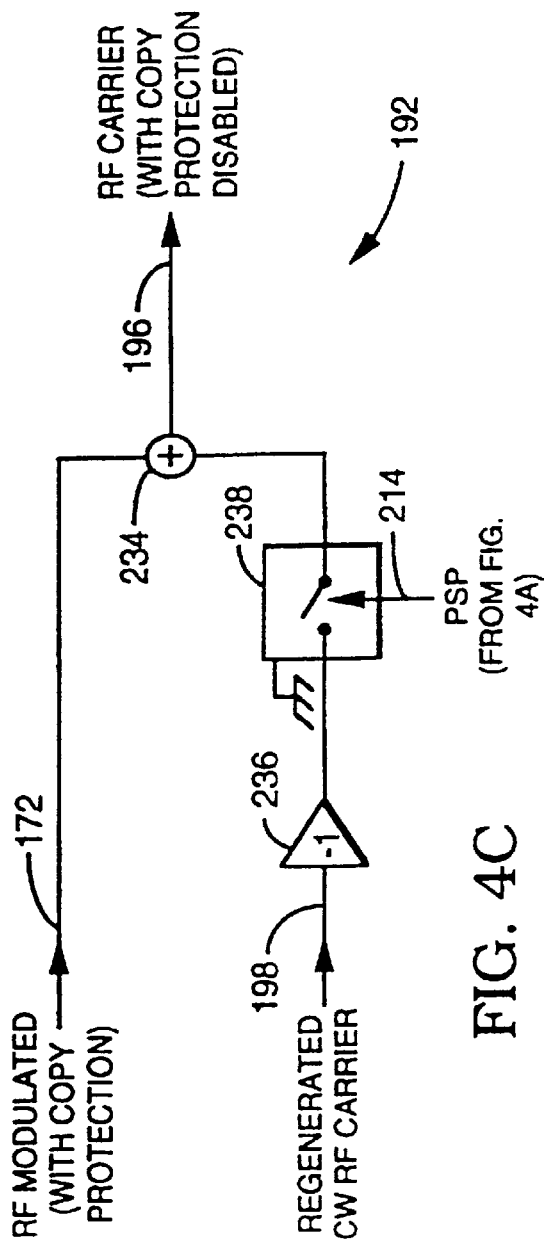

FIG. 4C depicts an alternative example of the depth of modulation circuit 192 of FIG. 4, which is similar to the example of FIG. 4B but which utilizes the PS signals instead of the AGC signals to disable the RF carrier modulating anti-copy pseudo-sync signals providing the copy protection. To this end, the modulated RF carrier signal on the lead 172, FIG. 4, is supplied to a summing circuit 234 of FIG. 4C. The regenerated continuous wave RF carrier signal on the lead 198, FIG. 4, is supplied to an inverter 236 and thence to one input terminal of a switching circuit 238. The other input terminal of switching circuit 238 is coupled to ground, and switching control is provided by the PSP signal on the lead 214 of FIG. 4A. The output of the switching circuit 238 is coupled to a second input of the summing circuit 234, and supplies thereto an inverse phase visual RF carrier signal which is regenerated or derived during the time interval of the RF carrier is modulated by pseudo-sync signals. This inverse carrier signal is combined with the modulated RF carrier signal on lead 172 by the summing circuit 234. The resulting re-assembled RF carrier signal on the output lead 196 (also FIG. 4) has reduced peak carrier levels for pseudo-sync pulses such that, when subsequently detected by the associated circuitry in, for example, a VCR, the reduced pseudo-sync pulse amplitudes allow the making of an acceptable recording. The circuit of FIG. 4C also preserves the aural RF carrier signal during the switching process of the switching circuit 238 in response to the PSP on lead 214.

In an alternative to the PS pulse suppression technique of previous description in FIG. 4C, if the pulse widths of the pseudo-sync pulses of the output of the AND gate 210 on the lead 214 are narrowed instead, then when the PSP signal is applied to control the switching circuit 238, FIG. 4C, the anti-copy pseudo-sync pulses of the modulated RF carrier output on lead 196 likewise are narrowed. The result is that the narrowed pseudo-sync pulses are not detectable by a subsequent VCR whereby an acceptable recording is permitted.

Figure 4D:
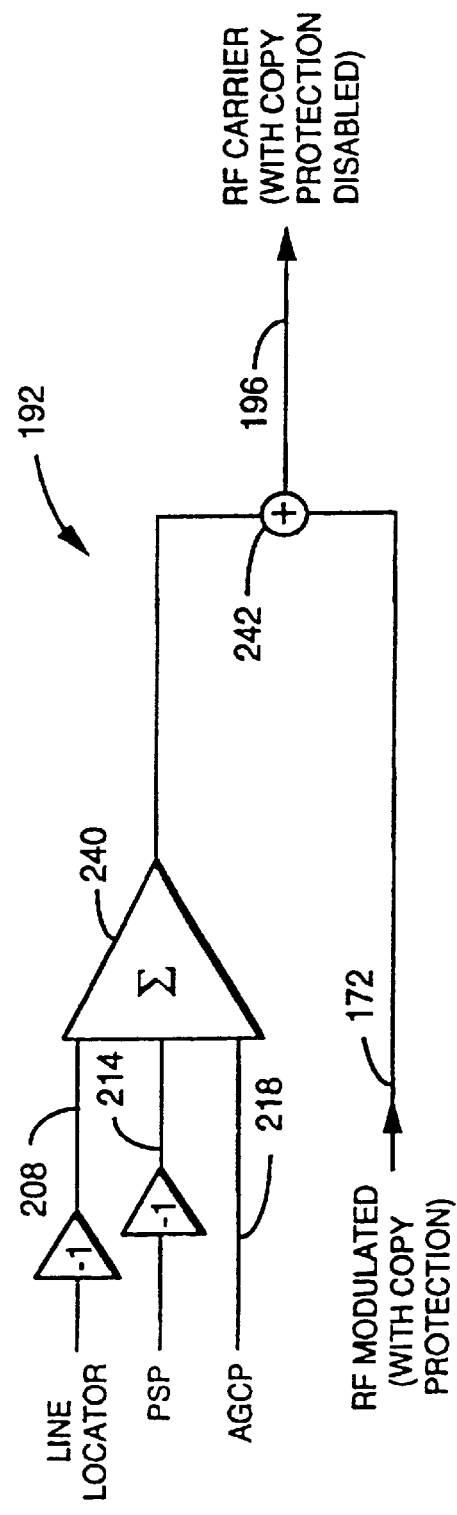

FIG. 4D depicts another alternative example of the depth of modulation circuit 192 of FIG. 4. This circuit reduces the peak modulation(even to about zero carrier amplitude) of the PS pulses and/or reduces the depth of modulation of the RF carrier envelope coincident with the AGC pulses by way of an RF modulating, that is, a gain control, technique. In addition, the circuit of FIG. 4D also may be used to reduce the overall RF carrier modulation of either or both the AGC and pseudo-sync modulated RF envelope such that when demodulated or detected by, for example, a record VCR, results in a video signal with a combination of attenuated and level shifted pseudo-sync pulses with attenuated AGC pulses relative to the program video during the active television field signal, which permits an acceptable recording. Alternatively,the depth of modulation circuit 192 may be used to remove the RF carrier signal during copy protection signal modulation as to allow a recordable copy.

To this end, referring first to FIG. 4A, the inverted versions of the timing signals labeled line locator on lead 208 and PSP on lead 214, and the timing signal AGCP on lead 218, are supplied to the inputs of a summing amplifier 240 in FIG. 4D. The output of the summing amplifier 240 is supplied to an AM RF modulator circuit 242 along with the modulated RF carrier signal on the lead 172 (FIG. 4) which contains the RF carrier modulating anti-copy pulses. The summing amplifier 240 thus controls the gain of the RF modulator 242 in response to one of the signals input thereto on the leads 208, 214 and 218. More particularly, the line locator signal causes the attenuation and/or level shifting of pseudo-sync pulses when subsequently demodulated by, for example, a record VCR. The PSP signal causes reduced peak RF carrier in the output on lead 196 which permits copying during the subsequent pseudo-sync modulation by record VCR circuitry. Alternatively, application of the AGCP pulses cause the RF carrier level to be at an increased carrier level during the AGC pulse modulation which, when detected by a tuner circuit of the record VCR, results in reduced AGC pulse amplitudes. Thus, use of the circuit of FIG. 4D results in the record VCR making an acceptable recording in which the copy protection signals have been disabled in accordance with the RF domain techniques of the invention.

In an alternative RF domain technique, narrowing of the PSP and/or AGCP pulses supplied on leads 214,218 provides correspondingly narrowed RF carrier modulated by pseudo-sync and/or AGC pulses which, when demodulated by the record VCR, provide similarly acceptable recordings of the video signal. The narrowing of the PSP and/or AGCP pulses may be accomplished as depicted, for example, in FIG. 3B.

Figure 5:
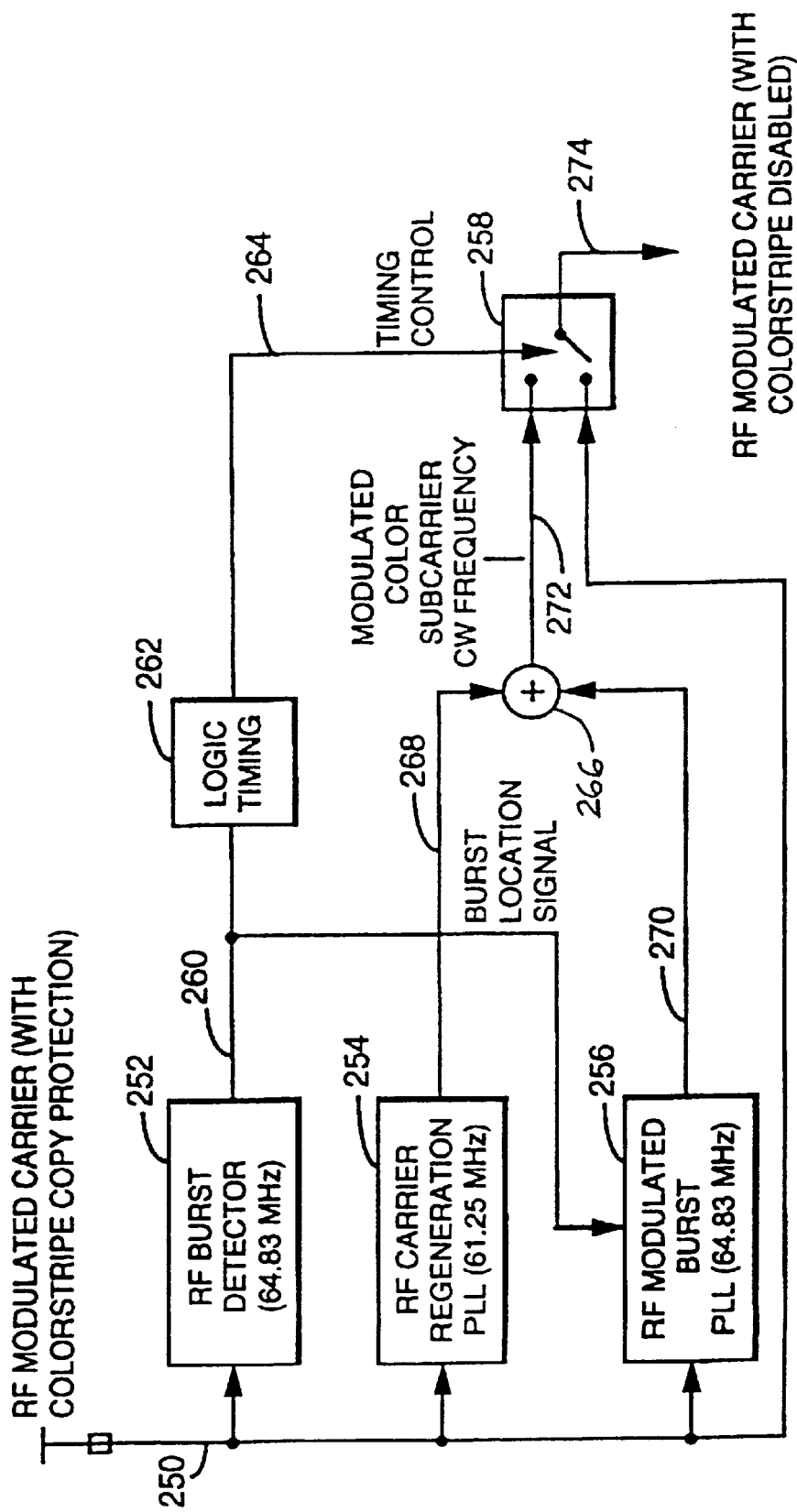
FIG. 5 is a block diagram of still another embodiment in accordance with the invention.

FIG. 5 illustrates a further embodiment of the invention, which embodiment provides means operating in the RF domain for disabling copy protection provided by the color stripe effect of previous discussion, wherein the color burst integral with a video signal is phase modulated in some manner to prevent acceptable copying. Referring to the block diagram, a modulated RF carrier signal, containing color stripe copy protection signals, is supplied via an input lead 250 to a detector circuit 252 for detecting an RF carrier modulated by color burst, to a RF carrier regeneration circuit 254, to a phase lock loop (PLL) 256 for providing a RF carrier with modulating color burst, and to one input terminal of a RF switching circuit 258. The modulated RF carrier signal is supplied from off-air via a television channel, a cable system, etc., and in this example is derived from channel 3. The RF burst detector (i.e. at 64.83 Mhz) is coupled via a lead 260 to a logic timing circuit 262 which thence provides a control signal to the RF switching circuit 258 via a lead 264. The lead 260 also is coupled as a control signal to the RF modulated by burst PLL 256. The output of the RF carrier regeneration PLL 254 is coupled to one input of a summing circuit 266 via a lead 268. The output of the RF modulated burst PLL 256 is coupled to a second input of the summing circuit 266 via a lead 270. The output of the summing circuit 266 is supplied via a lead 272 to a second input of the RF switching circuit 258, whose output supplies a RF carrier signal on an output lead 274 wherein the color stripe copy protection signal has been disabled thereby allowing the subsequent making of acceptable recordings. Accordingly, the circuit of FIG. 5 operates in the RF domain to provide a regenerated color burst modulated onto a RF carrier signal which, when demodulated, contains ineffective color stripe burst signals which have been sufficiently modified to permit the recording of an acceptable copy.

Figure 5A:
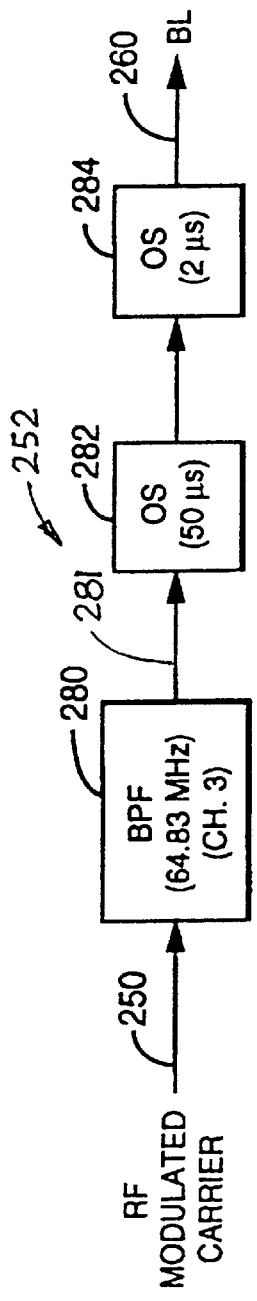
FIGS. 5A, 5B are block diagrams illustrating further details of a circuit for detecting an RF carrier signal modulated by a color burst, and a phase lock loop for providing a RF carrier modulated by a color burst, respectively, of the invention of FIG. 5.

The burst detector circuit 252 of FIG. 5 provides circuitry which derives a color burst (CB) control signal from the incoming RF modulated carrier on the lead 250 containing color stripe color protection modulated onto the RF carrier. To this end, FIG. 5A illustrates by way of example only, such a circuitry. The modulated RF carrier signal from, for example, the channel 3 broadcast station, is supplied on lead 250 to a bandpass filter (BPF) 280. In this example, the RF carrier of channel 3 has a frequency of 61.25 MHz modulated by the color burst frequency of 3.58 MHz (for the NTSC standard), whereby the modulated RF carrier signal on lead 250 has a frequency of 64.83 MHz. Thus, the BPF 280 filters out the RF carrier frequency of 61.25 MHz to extract via the BPF 280 onto a lead 281, a signal coincident with the RF carrier modulated by color burst but having a frequency of 64.83 MHz. This signal is supplied to a one-shot multivibrator 282 of, for example, 50 microseconds duration. The one-shot 282 triggers off the leading edge of the filtered 64.83 MHz signal and is immune to any color signal in the 64.83 MHz signal since the pulse duration of 50 microseconds extends the pulse the full time duration of an active television line. The signal output from the one-shot 282 thus contains only a 50 microsecond pulse triggered from the RF modulated by color burst. This latter signal is supplied to a one-shot multivibrator 284 of 2 microseconds duration which is triggered by the leading edge of the 50 microsecond pulse to provide a signal coincident with color burst but at 64.83 MHz, which thus represents the timing location of the RF carrier modulated by color burst. Thus, the output of the one-shot 284 is a modulating burst location signal (BL) on the lead 260 (FIG. 5), which is unaffected by any other modulating chroma signal, is coincident with the RF carrier modulated by color burst occurrence, and which is used as a timing control signal to control the operation of the RF modulated by burst PLL 256, as described below. A similar BL signal may be derived from the composite sync signal on the lead 187 of FIG. 4, or from the H sync signal derived from the circuit 16 of FIG. 1.

The burst location signal also is supplied via the lead 260 to the logic timing circuit 262 which provides a BL related timing control signal on the lead 264 for switching the switching means 258 in coincidence with the RF carrier modulating anti-copy color stripe signals contained in the modulated RF carrier signal. The circuit 262 may be simply a lead, or may be a logic circuit that derives a timing control signal which is coincident with the RF carrier modulated by color stripe bursts.

In FIG. 5, the RF carrier regeneration PLL 254 includes a phase lock loop having a 61.25 MHz frequency matching the RF carrier frequency of the respective off-air television channel, which in this example is channel 3. If other channels and frequencies are used, then the frequencies of the various PLL circuits are selected accordingly. The signal provided by the PLL 254 on the lead 268 is a continuous wave (CW) RF carrier of 61.25 MHz which is supplied to the summing circuit 266 for combination with the output signal from the RF modulated by burst PLL 256.

Figure 5B:
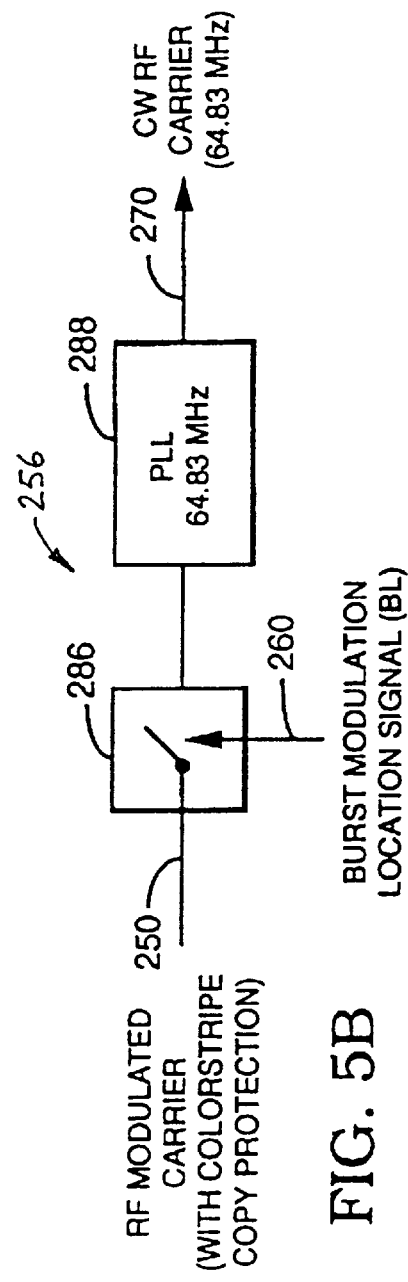
Figure 5C:
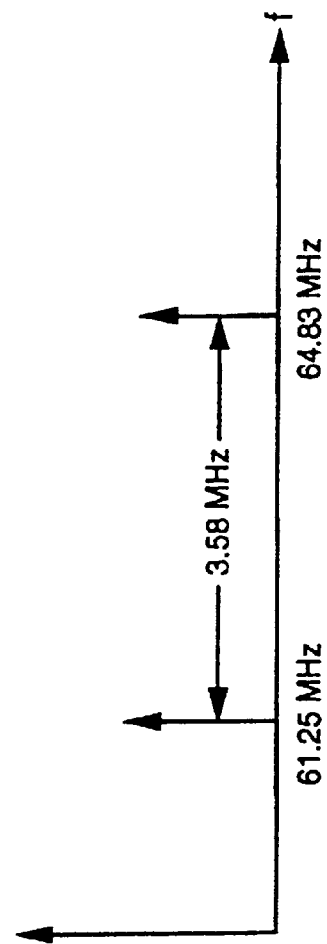
FIG. 5C is the spectrum of a 3.58 Mhz color burst modulating a 61.25 MHz RF carrier. This spectrum consists of two frequencies, 61.25 Mhz and 64.83 MHz.

The RF modulated burst PLL 256 is illustrated in FIG. 5B in further detail, and includes in this example a gate circuit 286 which is coupled to the bandpass filtered signal on the lead 250, and is gated by the modulating burst location signal (BL) on the lead 260, FIGS. 5, 5A. The gate circuit 286 supplies a resulting gated burst modulation signal to a PLL 288 of 64.83 MHz frequency, which PLL 288 corresponds to the phase lock loop portion of the RF modulated by burst PLL 256 of FIG. 5. The PLL 288 supplies a color burst modulated RF carrier continuous wave signal on the lead 270. Due to the inertia of the PLL 288, any color stripe phase errors modulated onto the RF carrier are removed by the averaging process of the PLL.

As previously mentioned, the continuous wave RF carrier on the lead 268 is combined with the continuous wave color burst modulated RF carrier on the lead 270 by the summing circuit 266, to provide a RF modulated, color subcarrier continuous wave frequency on the lead 272, FIG. 5, which is supplied to the RF switching circuit 258. In response to the timing control signal on lead 264, the RF modulated, color subcarrier signal on lead 272 is inserted in the original modulated RF carrier signal which has color stripe copy protection, during the intervals that the color stripe modulation is present. Thus, the output lead 274 provides a RF carrier signal wherein the modulating color stripe copy protection signal is disabled, such that acceptable copies can be made subsequently, for example, by a record VCR.

It is to be understood that although the description herein of the various embodiments of the FIGS. 1–5 illustrates the invention techniques as replacing or otherwise modifying all the cycles of the copy protection waveforms modulated onto the RF carrier signal, the invention further intends that only portions of the RF carrier modulating- pseudo-sync and/or AGC pulses, or of the color burst, or only a selected number of the anti-copy signals, need be replaced or modified to provide the intended disabling of the copy protection in the RF domain. Thus, for example, in the techniques wherein the pseudo-sync and/or AGC anti-copy pulses are being replaced or otherwise modified, only a portion of the pseudo-sync and/or AGC pulses modulating the RF carrier signal need be modified. Alternatively, the modulating anti-copy pulses may be selectively narrowed such that they are not detectable subsequently by the VCR circuitry. Still further, only a selected number of the anti-copy signals may be replaced, altered, narrowed or otherwise modified to provide the same effect of disabling the anti-copy signals and thus the copy protection. Similarly, in the techniques wherein the RF carrier modulating color stripe effect provides copy protection, only a selected number of cycles of the subsequently demodulated waveform, or only a few lines containing color stripe copy to protection, when demodulated, need be replaced or modified in the RF domain to cause similarly disabling the process in accordance with the invention. It should be known that varying the duty cycle(narrowing) and or frequency of the RF carrier during the copy protection signal modulation can also result in a recordable copy. This is analogous to the Quan et al U.S. Pat. No. 5,194,965. Also see pulse narrowing circuits such as FIG. 3B circuits 132 and 134. Also see frequency varying circuit such as in FIG. 3B, circuit 154. Likewise, the amplitude level of the RF carrier during modulation from the copy protection signals may be varied (for example,even to cause an RF drop out) as to allow a recordable copy.

Accordingly, although the invention has been described herein relative to specific embodiments and alternatives thereto, various additional features and advantages will be apparent from the description and drawings, and thus the scope of the invention is defined by the following claims and their equivalents.

What is claimed is:

1. A method of removing in an RF domain the effects of copy protection signals added in blanking intervals of selected video lines of a video signal to prevent a recording of an acceptable copy of the video signal while allowing the copy protected video signal to be viewed, comprising the steps of:

provided from the viewable video signal a sole RF carrier signal which contains the copy protection signals embedded therein in said selected video lines thereof;

producing from the sole RF carrier signal a timing control signal indicative of the location of the copy protection signals; and modifying in the RF domain, in response to the timing control signal, a quantity of the copy protection signals in the viewable video signal during their occurrence in the RF carrier signal such that the copy protection signals are sufficiently disabled when subsequently demodulated to allow the recording of an acceptable copy of the previously only viewable video signal.

2. The method of claim 1 wherein the step of producing includes the steps of:

providing horizontal and vertical sync signals from the RF carrier which identify the timing location of said selected video lines and the associated copy protection signals; and producing the timing control signal in response to the horizontal and vertical sync signals.

3. A method of removing in an RF domain the effects of copy protection signals added in blanking intervals of selected video lines of a video signal to prevent a recording of an acceptable copy of the video signal, comprising the steps of:

providing from the video signal an RF carrier signal which contains the copy protection signals embedded therein in said selected video lines thereof;

said copy protection signals comprising pseudo-sync pulses, and/or automatic gain control (AGC) pulses;

said RF carrier signal being modulated by the pseudo-sync and/or AGC pulses in said selected video lines to provide the copy protection signals;

producing from the RF carrier signal a timing control signal indicative of the presence of the copy protection signals; and modifying in the RF domain a quantity of the copy protection signals during their occurrence in the RF carrier signal, wherein the step of modifying includes selectively altering in response to the timing control signal the RF carrier signal during the occurrence of said quantity of the copy protection signals, such that the copy protection signals are sufficiently disabled when subsequently demodulated to allow the recording of an acceptable copy of the video signal.

4. The method of claim 3 wherein the step of modifying includes:

level shifting or otherwise attenuating a peak envelope of the modulated RF carrier signal in time intervals coincident with the pseudo-sync and/or AGC pulses in response to the timing control signal.

5. The method of claim 3 wherein the step of modifying includes:

generating a second RF carrier signal of a frequency similar to that of the modulated RF carrier signal; and adding or subtracting the second RF carrier signal to or from the modulated RF carrier signal coincident with the occurrence of the pseudo-sync and/or AGC pulses in response to the timing control signal.

6. The method of claim 3 wherein the step of modifying includes:

altering the amplitude level of the modulated RF carrier signal coincident with the occurrence of the pseudo-sync and/or AGC pulses in response to the timing control signal.

7. The method of claim 3 wherein the step of modifying includes:

effectively narrowing the pseudo-sync and/or AGC pulses in response to the timing control signal to defeat the affect thereof when subsequently demodulating the pulses during recording of the acceptable copy.

8. The method of claim 3 wherein the step of modifying includes:

generating a second signal of selected characteristics and of a frequency similar to that of the modulated RF carrier signal; and replacing the modulated RF carrier signal during the occurrence of the pseudo-sync and/or AGC pulse with the second signal in response to the timing control signal.

9. The method of claim 8 wherein the second signal comprises; a RF carrier signal modulated by a noisy color signal, a color bar signal or a signal with insufficient copy protection signals; an unmodulated RF carrier signal; or a signal of a sufficiently low value as to be ineffective when subsequently demodulated.

10. A method of removing in an RF domain the effects of copy protection signals added in blanking intervals of selected video lines of a video signal to prevent a recording of an acceptable copy of the video signal, comprising the steps of:

providing from the video signal an RF carrier signal which contains the copy protection signals embedded therein in said selected video lines thereof;

said copy protection signals comprising color stripe burst signals having deliberate color burst phase errors;

the modulated RF carrier signal being modulated by said color stripe burst signals in the selected video lines to prevent the recording of an acceptable copy;

producing from the RF carrier signal a timing control signal indicative of the presence of the copy protection signals; and modifying in the Rf domain a quantity of the copy protection signals during their occurrence in the RF carrier signal, wherein the step of modifying includes selectively altering in response to the timing control signal the RF carrier signal during the occurrence of said quantity of the copy protection signals, such that the copy protection signals are sufficiently disabled when subsequently demodulated to allow the recording of an acceptable copy of the video signal.

11. The method of claim 10 wherein the step of modifying includes:

modifying in response to the timing control signal the depth of modulation or the phase shift of the modulating color stripe burst signals sufficiently to present a correct color burst phase when subsequently demodulated.

12. The method of claim 10 wherein the step of modifying includes:

generating a correct RF carrier modulating color subcarrier signal from the modulated RF carrier signal; and replacing the modulated RF carrier signal during the intervals of the color stripe burst signals with the correct RF carrier modulated by color subcarrier signal in response to the timing control signal.

13. The method of claim 12 wherein the step of generating includes:

regenerating a RF carrier of the modulated RF carrier signal;

regenerating a sideband frequency signal formed of the frequency of the RF carrier plus the frequency of the color burst signals; and summing the regenerated RF carrier and the sideband frequency signal in the RF domain to generate the correct RF carrier modulating color subcarrier signal.

14. The method of claim 10 wherein the step of modifying includes:

regenerating a RF carrier of the modulated RF carrier signal;

regenerating a sideband frequency signal formed of the frequency of the RF carrier plus the frequency of the color burst signals;

mixing the phase modulated color stripe burst signals with a phase shifted harmonic of the sideband frequency signal; and low pass filtering the mixed signals to remove the copy protection provided by the color stripe burst signals.

15. A method of defeating in an RF domain copy protection signals, including pseudo sync pulses and/or back porch AGC or AGC pulses, or color stripe signals, added in blanking intervals of selected video lines of a modulated RF carrier signal to inhibit the making of acceptable recordings of an associated video signal, comprising the steps of:

modulating the RF carrier signal in said selected lines with the pseudo sync pulses, and/or back porch AGC or AGC pulses, or color stripe signals;

providing from the modulated RF carrier signal during the selected video lines a timing control signal indicative of the presence of the copy protection signals;

modifying in the RF domain the pseudo sync pulses, and/or back porch AGC or AGC pulses, or color stripe signals in the modulated RF carrier signal during their presence in the selected video lines in response to the step of providing, to defeat the affect of the copy protection signals when subsequently demodulated.

16. The method of claim 15 including the steps of:

supplying the modulated RF carrier signal via a selected source;

recovering a baseband video signal from the modulated RF carrier signal, while removing a residual visual RF carrier frequency signal;

separating normal vertical and horizontal sync pulses, as well as the copy protection signals, from the baseband video signal;

generating the timing control signal indicative of the presence of the copy protection signals in response to the normal vertical and horizontal sync pulses; and modifying the modulated RF carrier signal in response to the timing control signal when the copy protection signals are present, to defeat the affect of the copy protection signals and permit acceptable recordings of the associated video signal.

17. The method of claim 15 wherein the step of modifying includes:

attenuating via filter means the modulated RF carrier signal in response to the timing control signal during the presence of the copy protection signals.

18. The method of claim 15 wherein the step of modifying includes:

suppressing via RF voltage control means the peak envelope of the copy protection signals during the selected video lines in response to the timing control signal.

19. The method of claim 15 wherein the step of modifying includes:

providing a second RF carrier signal which is not modulated or does not contain RF modulating copy protection signals; and replacing the modulated RF carrier signal having copy protection signals with the second RF carrier signal in response to the timing control signal.

20. The method of claim 15 wherein the step of modifying includes:

generating a continuous wave RF carrier signal of similar frequency from the modulated RF carrier signal; and changing the depth of modulation of the modulated RF carrier signal with the continuous wave RF carrier signal during the presence of the copy protection signals in response to the timing control signal.

21. The method of claim 20 wherein horizontal and vertical sync signals are used to modulate the modulated RF carrier signal, and the step of providing includes:

restoring a minimum DC level of the modulated RF carrier signal;

generating from the restored minimum DC level, RF burst signals that reflect the pulse width of the horizontal and vertical sync pulses; and filtering out the horizontal and vertical sync pulses in response to the RF burst signals.

22. The method of claim 3 wherein the copy protection signals further comprise back porch AGC pulses, wherein:

the step of providing includes modulating in the RF domain the RF carrier signal in said selected video lines with the pseudo-sync and/or AGC or back porch AGC pulses; and the steps of modifying includes sufficiently altering, replacing or deleting a selected quantity of the pseudo-sync and/or AGC or back porch AGC pulses in response to the timing control signal such that the latter signals subsequently can be properly demodulated to permit the recording of an acceptable copy of the associated video signal.

23. The method of claim 22 wherein the copy protection signals comprise the color stripe burst signals having deliberate color burst phase errors, wherein:

the step of supplying includes modulating in the RF domain the RF carrier signal in said selected video lines with the color stripe burst signals; and the step of modifying includes sufficiently altering, replacing or deleting a selected quantity of the color stripe burst signals to present a correct color burst phase when subsequently demodulated.

24. Apparatus for disabling copy protection signals formed of pseudo sync pulses and/or AGC pulses, or color stripe signals added in blanking intervals of selected video lines of an associated video signal to prevent the recording of an acceptable copy of the copy protected video signal while allowing the video signal to be viewed, comprising;

means receiving the viewable video signal for supplying a RF carrier signal which is modulated by the pseudo sync pulses and/or AGC pulses forming the copy protection signals;

means receiving the modulated RF carrier signal for producing a timing control signal indicative of the timing location of the copy protection signals; and means responsive to the timing control signal for modifying in a RF domain said copy protection signals or portions thereof during their presence in the modulated RF carrier signal, to sufficiently disable the copy protection signals when subsequently demodulated to permit the recording of acceptable copies of the previously only viewable video signal.

25. The apparatus of claim 24 wherein the modifying means includes:
RF switch means coupled to the modulated RF carrier signal and responsive to the timing control signal; and
filter means receiving the modulated RF carrier signal for selectively altering the copy protection signals in response to switching of the RF switch means by the timing control signal, to provide an output RF carrier signal with the copy protection signals effectively disabled.

26. The apparatus of claim 25 wherein:
said filter means is a notch filter responsive to the timing control signal for passing the modulated RF carrier signal in the absence of the copy protection signals and selectively attenuating the modulated RF carrier signal in the presence of the copy protection signals.

27. The apparatus of claim 24 wherein the modifying means includes:
RF modulator means receiving the modulated RF carrier signal for suppressing a peak envelope of the latter carrier signal during the blanking interval in response to the timing control signal.

28. The apparatus of claim 24 wherein the modifying means includes:
RF switch means coupled at one input to the modulated RF carrier signal and at another input to a second signal, said RF switch means being responsive to the timing control signal to replace the modulated RF carrier signal with the second signal during the presence of the copy protection signals.

29. The apparatus of claim 28 wherein the second signal comprises:
an unmodulated RF carrier; a signal of sufficiently low value as to be ineffective when subsequently demodulated; or an RF carrier signal modulated by a noisy color signal, a color bar signal or a signal with insufficient copy protection signals.

30. The apparatus of claim 24 wherein the producing means includes:
means for providing a baseband video signal from the modulated RF carrier signal;
sync separator means for providing vertical and horizontal sync signals from the baseband video signal; and
logic timing means for producing said timing control signal in response to the vertical and horizontal sync signals.

31. The apparatus of claim 24 wherein the modulated RF carrier signal is a luminance signal, and said modifying means includes:
source means for supplying a second signal of selected RF frequency; and
RF switch means receiving the luminance modulated RF carrier signal and the second signal from the source means, for inserting in response to the timing control signal the second signal from the source means into the luminance modulated RF carrier signal during the presence of the copy protection signals.

32. The apparatus of claim 24 wherein the modulated RF carrier signal is a luminance signal, and said modifying means includes:

oscillator means for supplying a second signal of selected frequency;
modulator means receiving the luminance modulated RF carrier signal and the second signal from the oscillator means, for generating a sideband signal; and
RF switch means receiving the luminance modulated RF carrier signal and the sideband signal for level shifting the copy protection signals in the luminance modulated RF carrier signal with the sideband signal in response to the timing control signal, to disable the copy protection signals.

33. The apparatus of claim 24 wherein the producing means includes:
means including a detector for generating a baseband luminance demodulated signal;
sync separator means for providing vertical and horizontal sync signals from the baseband luminance demodulated signal; and
logic timing means for providing in response to the vertical and horizontal sync signals a line locator signal indicative of active video lines containing the copy protection signals.

34. The apparatus of claim 33 wherein the logic timing means includes:
first multivibrator means receiving the horizontal sync signal for producing a pulse having a duration of an active video line;
second multivibrator means receiving the vertical sync signal for producing a signal indicative of the active video lines containing the copy protection signals; and
AND gate responsive to the first and second multivibrator means for producing the line locator signal.

35. The apparatus of claim 33 wherein the copy protection signals comprise modulating pseudo-sync and/or or back porch AGC pulses of selected voltage levels, and the producing means further include:
clamping/gate means receiving the baseband luminance demodulated signal for clamping the resulting luminance signal to a sync tip voltage level in response to the line locator signal;
means supplying first and second threshold voltages commensurate with the sync tip and AGC pulse voltage levels, respectively; and
comparator means responsive to said resulting luminance signal for providing selected logic levels PS and AGO coincident with the pseudo-sync and AGC pulses, respectively, to identify the timing location of the respective copy protection signals.

36. The apparatus of claim 35 including:
pulse narrowing means including AND gates receiving the selected logic levels PS and AGC from respective comparator means, for providing narrowed logic levels NPS and NAGC coincident with correspondingly narrowed modulating pseudo-sync and AGC pulses, respectively, which effectively are disabled when subsequently demodulated.

37. The apparatus of claim 36 further including:
a logic combining circuit responsive to the line locator signal and selected logic levels of the PS, AGC, NPS and NAGC logic levels, for producing the timing control signal supplied to the modifying means.

38. The apparatus of claim 24 wherein the modifying means includes:
RF carrier regeneration means receiving the modulated RF carrier signal for providing a continuous wave RF carrier of a frequency similar to the frequency of the modulated RF carrier signal; and a depth of RF carrier modulation circuit receiving the modulated RF carrier signal and the continuous wave RF carrier for selectively modifying the modulated RF carrier signal with the continuous wave RF carrier during the time intervals of the copy protection signals in response to the timing control signal.

39. The apparatus of claim 38 wherein the producing means includes:

sync slicing/filter means receiving the modulated RF carrier signal for providing a vertical sync signal and a composite sync signal including horizontal sync and pseudo-sync signals; and a logic timing circuit responsive to the vertical sync and composite sync signals for providing logic levels PS and AGC coincident with pseudo-sync and/or automatic gain control (AGC) signals, respectively, and for producing therefrom the timing control signal indicative of the timing location of the pseudo-sync and/or AGC signals.

40. The apparatus of claim 39 wherein the sync slicing/filter means includes:

a DC restoration circuit receiving the modulated RF carrier signal for restoring an envelope thereof to its peak DC value corresponding to a sync tip voltage level;

comparator means responsive to the DC restoration circuit for slicing the peak RF value just below its maximum to provide bursts of RF coincident in timing location with the pseudo-sync and/or AGC signals; and filter means responsive to the sliced peak RF value for providing a composite sync signal including vertical sync, horizontal sync and pseudo-sync signals.

41. The apparatus of claim 40 wherein:

the comparator means includes a threshold voltage input for establishing the slicing level; and the filter means includes a first lowpass filter for providing the composite sync signal, and a second low pass filter for separating the vertical sync signal from the composite sync signal.

42. The apparatus of claim 39 wherein the logic timing circuit includes:

first multivibrator means receiving the composite sync signal for producing a pulse having a duration of a video line;

second multivibrator means receiving the vertical sync signal for producing pulses indicative of the video lines containing the pseudo-sync and/or AGC signals;

AND gate responsive to the first and second multivibrator means for producing a line locator signal indicative of the video lines containing the pseudo-sync and/or AGC signals; and gate/logic means receiving the line locator signal and the composite sync signal for producing the timing control signal.

43. The apparatus of claim 42 wherein the gate/logic means includes:

an AND gate receiving the line locator signal and the composite sync signal for providing the pseudo-sync signals;

multivibrator means responsive to the pseudo-sync signals for providing the AGC signals; and a logic combining circuit responsive to the line locator signal and the pseudo-sync and AGC signals for producing the timing control signal.

44. The apparatus of claim 39 wherein the depth of RF modulation circuit includes:

RF switch means for replacing the modulated RF carrier signal with the regenerated continuous RF carrier during the presence of the AGC copy protection signals in response to the AGC logic level signal.

45. The apparatus of claim 39 wherein the depth of RF modulation circuit includes:

means for inverting the phase of the regenerated continuous wave RF carrier;

RF switch means receiving the inverted continuous wave RF carrier and responsive to the PS logic level signal; and summing means for summing the modulated RF carrier signal with the inverted phase continuous wave RF carrier during the presence of the pseudo-sync copy protection signals in response to the PS logic level signals.

46. The apparatus of claim 39 wherein the depth of RF modulation circuit includes:

summing amplifier means receiving inverted logic level PS and line locator signals, and the logic level AGC signal, for providing a gain control signal;

RF modulator means for selectively modifying the modulated RF carrier signal in response to the gain control signal as directed by either the line locator, the PS or AGC logic level signals.

47. The apparatus of claim 24 wherein the copy protection signals comprise the color stripe burst signals which further contain deliberate color burst phase errors, and wherein the modifying means includes:

first means for generating a continuous wave RF carrier of a frequency similar to a selected frequency of the modulated RF carrier signal;

second means responsive to the color burst for generating a color burst modulated continuous wave RF carrier signal having said similar selected frequency;

summing means for combining the continuous wave RF carrier with the color burst modulated continuous wave RF carrier signal to provide a RF modulating color subcarrier continuous wave signal; and RF switch means for inserting the RF modulating color subcarrier signal in the RF modulated carrier signal during the presence of the copy protection signals in response to the timing control signal.

48. The apparatus of claim 47 wherein the producing means includes:

color burst detector means for producing from the modulated RF carrier signal a burst location signal coincident with the occurrence of the color burst; and logic timing means responsive to the burst location signal for producing the timing control signal.

49. The apparatus of claim 48 wherein the producing means includes:

bandpass filter means for producing a burst related signal coincident with the color burst but having a frequency commensurate with the selected frequency of the modulated RF carrier signal modulated by a color burst frequency;

first multivibrator means responsive to the burst related signal for producing a pulse having a duration commensurate with a duration of a video line; and second multivibrator means responsive to the pulse for producing the burst location signal coincident with the color burst but with the frequency of the burst related signal.

50. The apparatus of claim 48 wherein:

the first means for generating includes a phase lock loop having a frequency similar to the selected frequency; and the second means for generating includes;

RF gate means responsive to the bandpass filter means for passing the color burst related signals thereof in response to the burst location signal; and a phase lock loop having a frequency of the modulated RF carrier signal modulated by a color burst frequency, for generating the color burst modulated continuous wave RF carrier signal.

51. The apparatus of claim 24 wherein the modulated RF carrier signal includes an aural RF carrier portion, the apparatus including:

filter means receiving the modulated RF carrier signal for extracting therefrom the aural RF carrier portion;

summing means for receiving the extracted aural RF carrier portion;

wherein said modifying means includes;

a processing circuit receiving the modulated RF carrier signal for providing a RF carrier signal in which the copy protection signals are disabled, but wherein said aural RF carrier portion may be degraded; and notch filter means receiving the RF carrier signal with degraded aural RF carrier portion, for supplying to the summing means only the RF carrier signal with copy protection signals removed;

wherein the summing means combines the RF carrier signal without copy protection signals and the aural RF carrier portion to provide an RF carrier signal with aural RF carrier intact.

52. A method of adding in the RF domain copy protection signals to blanking intervals of selected video lines of a video signal to inhibit the copying of the video signal while allowing the copy protected video signal to be viewed, comprising the steps of:

supplying solely an RF carrier signal modulated by the viewable video signal;

producing a timing control signal from the sole RF carrier signal via demodulator means;

generating baseband copy protection signals in selected portions of the blanking interval of the modulated RF carrier signal; and modifying the RF carrier of the RF carrier signal in the blanking intervals in response to the baseband copy protection signals to modulate the RF carrier with the copy protection signals in the RF domain to inhibit the copying, while allowing the viewing, of the video signal.

53. The method of claim 52 wherein the step of modifying includes:

modulating the RF carrier in said selected portions of the blanking intervals to increase the amplitude thereof to form pseudo-sync signals for inhibiting copying of the video signal.

54. The method of claim 52 wherein the step of modifying includes:

modulating the RF carrier in said selected portions of the blanking intervals to increase and/or decrease the amplitude thereof to form pseudo-sync pulses and/or automatic gain control pulses, respectively, for inhibiting copying of the video signal.

55. The method of claim 52 wherein the video signal is modulated by color burst signals in the blanking intervals, and the step of modifying includes:

modulating the RF carrier in the presence of the color burst signals in the blanking intervals to alter the depth of modulation or the phase shift of the color burst signals to provide color stripe burst signals for inhibiting copying of the video signal.

56. The method of claim 52 wherein the step of modifying includes:

modulating the RF carrier in said selected portions of the blanking intervals to decrease and/or increase the frequency thereof to form pseudo-sync signals and/or automatic gain control signals, respectively, for inhibiting copying of the video signal.

* * * * *